United States Patent [19]

Lazar, Jr. et al.

[11] 4,445,410
[45] May 1, 1984

[54] APPARATUS FOR SHEARING BARS, BILLETS, AND OTHER ELONGATED STOCK

[75] Inventors: John D. Lazar, Jr.; Benyamin Shvartsman, both of Munster, Ind.

[73] Assignee: Bemcor, Inc., Hammond, Ind.

[21] Appl. No.: 289,363

[22] Filed: Aug. 3, 1981

Related U.S. Application Data

[63] Continuation of Ser. No. 72,224, Sep. 4, 1979, abandoned.

[51] Int. Cl.³ .................... B23D 15/04; B23D 35/00
[52] U.S. Cl. ........................ 83/390; 83/453; 83/461; 83/466; 83/563; 83/694
[58] Field of Search ............... 83/157, 198, 374, 379, 83/380, 382, 390, 452, 453, 456, 461, 460, 466, 563, 694, 698, 859

[56] References Cited

U.S. PATENT DOCUMENTS

| | | | |
|---|---|---|---|
| 2,644,520 | 7/1953 | Nelson | 83/198 X |
| 3,039,344 | 6/1962 | Hercik | 83/390 X |
| 3,451,298 | 6/1969 | Schaming | 83/459 X |
| 3,460,423 | 8/1969 | Hayashi | 83/390 |
| 3,908,496 | 9/1975 | Moelbert | 83/390 X |
| 3,972,257 | 8/1976 | Lazar, Jr. | 83/198 |
| 4,236,430 | 12/1980 | Hitt | 83/157 X |

FOREIGN PATENT DOCUMENTS

| | | | |
|---|---|---|---|
| 564727 | 11/1932 | Fed. Rep. of Germany | 83/385 |
| 460950 | 4/1975 | U.S.S.R. | 83/302 |

Primary Examiner—James M. Meister
Attorney, Agent, or Firm—Louis Robertson

[57] ABSTRACT

A method and apparatus for clamping a bar to be sheared, shearing the bar, and transmitting the shearing forces is disclosed. An infeed clamping assembly and moving shear blade assembly are retained within a housing formed from a plurality of retainer plates which are disposed between and connected to a pair of bolsters with keys inserted and interfitted into aligned key cavities in the retainer plates and bolsters. An infeed clamp assembly is provided with an infeed clamp adapted to be pivoted on a support block as the support block and clamp are moved against a bar to accommodate variation in bar cross section along the length of the bar. A rectangular cage having an interior guideway is provided to receive the portion of the bar to be sheared off. A backing clamp is carried by, and slidably movable within, the cage. The backing clamp is wedged against one side of the bar portion to be sheared off until the other side of the bar is engaged by a part of the cage. The entire cage and backing clamp is then forced by a ram to shear the bar. The housing is sufficiently sturdy to resist the spreading forces during shearing in spite of being essentially open sided so that the slab-like shearing assemblies can be removed easily through the open side for replacement and shop-servicing. The shearing blades and backing clamp are inserts, so that they alone may be easily replaced when no other servicing is needed. Actuating mechanism for the holding clamp lies between a retaining wall adjacent the open side and a U-shaped retaining wall block spaced from it.

14 Claims, 27 Drawing Figures

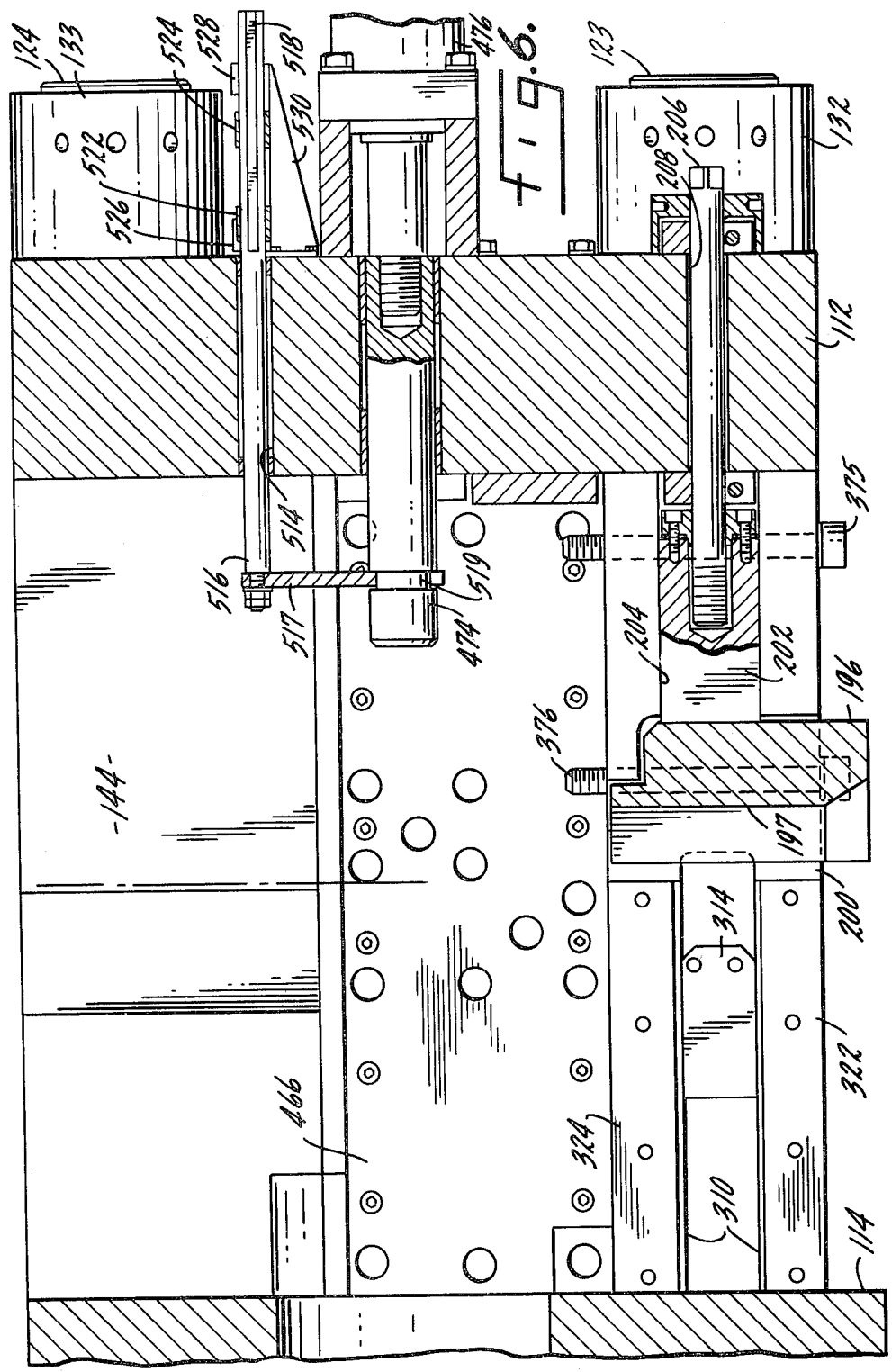

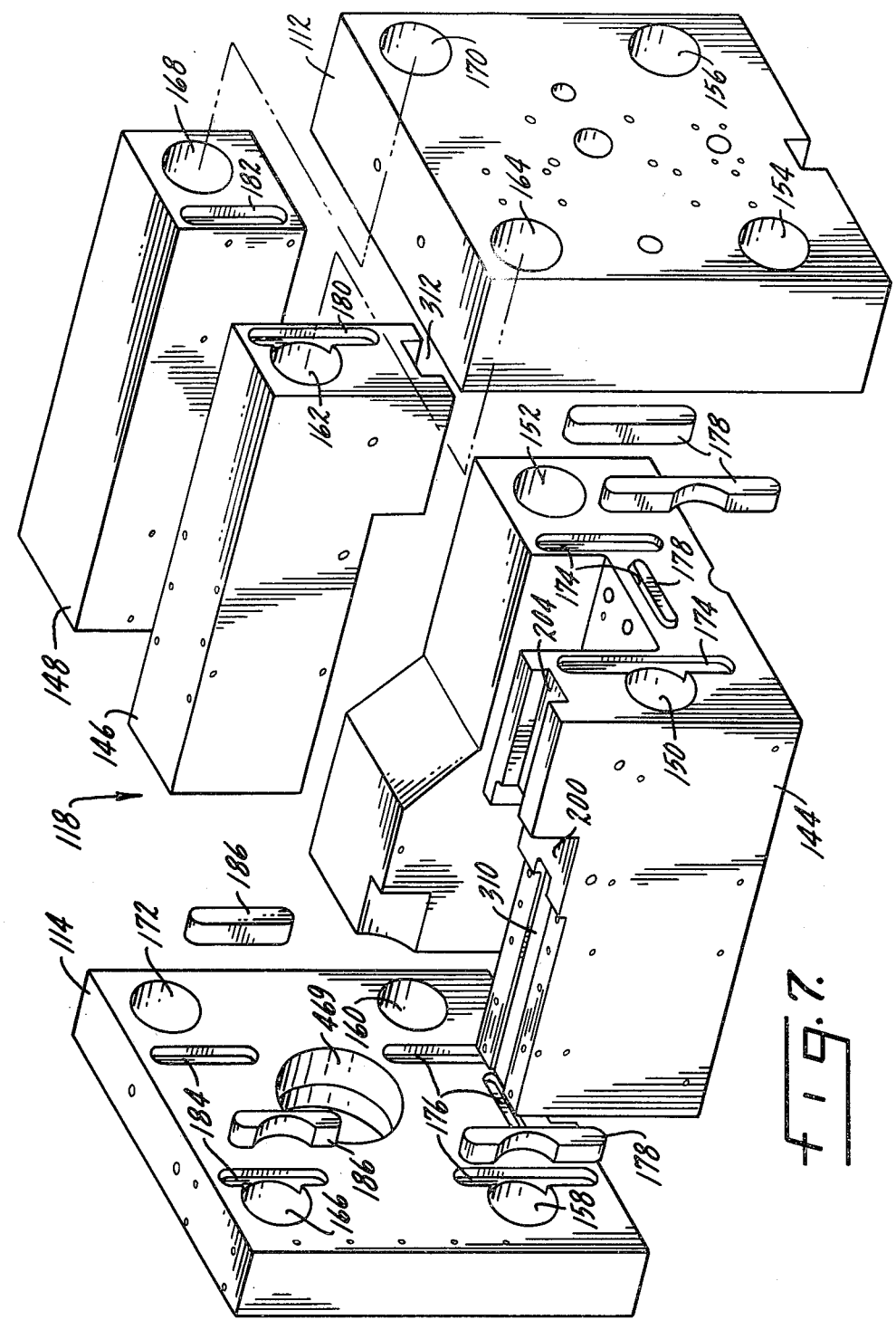

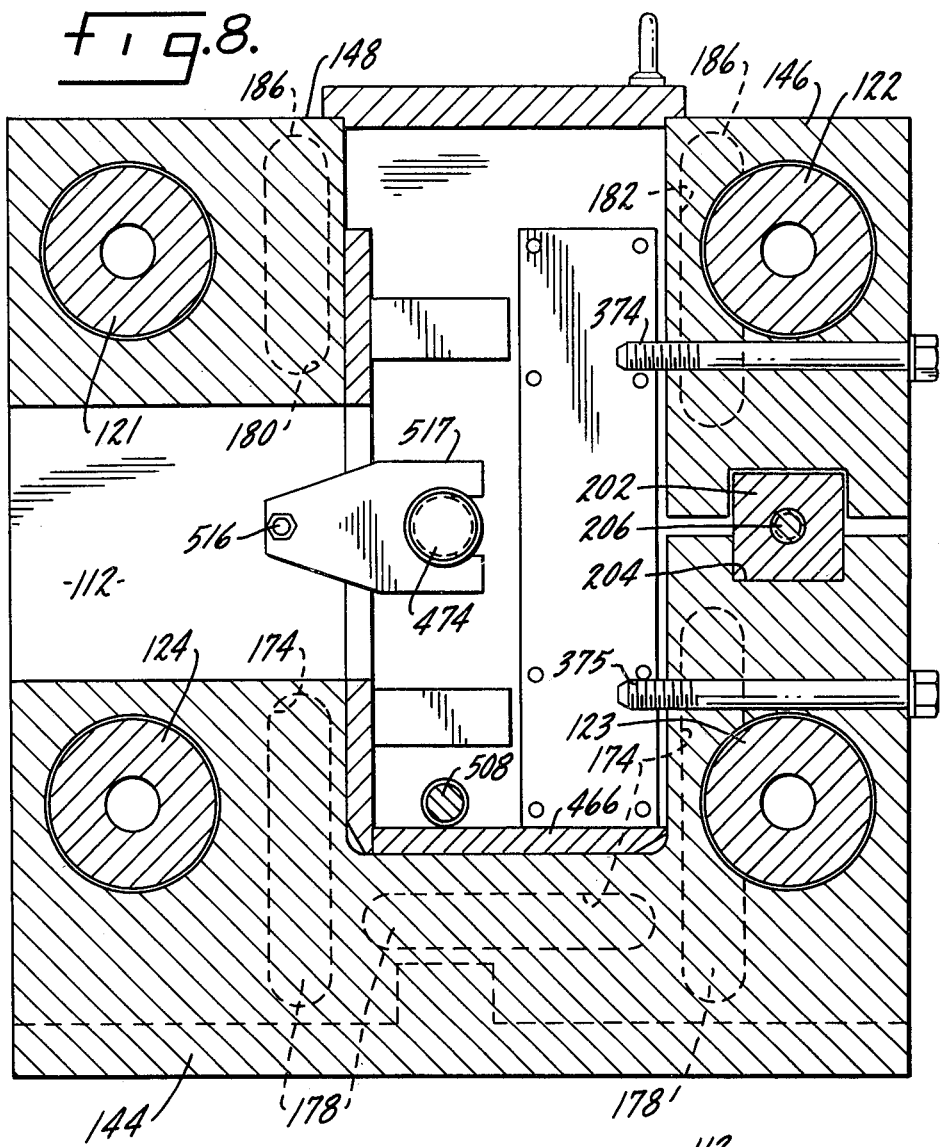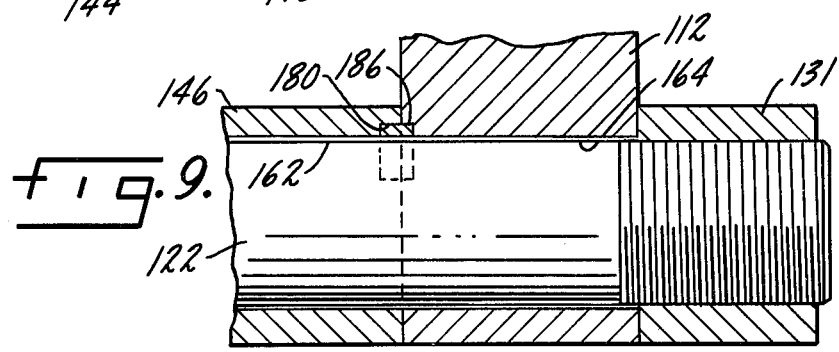

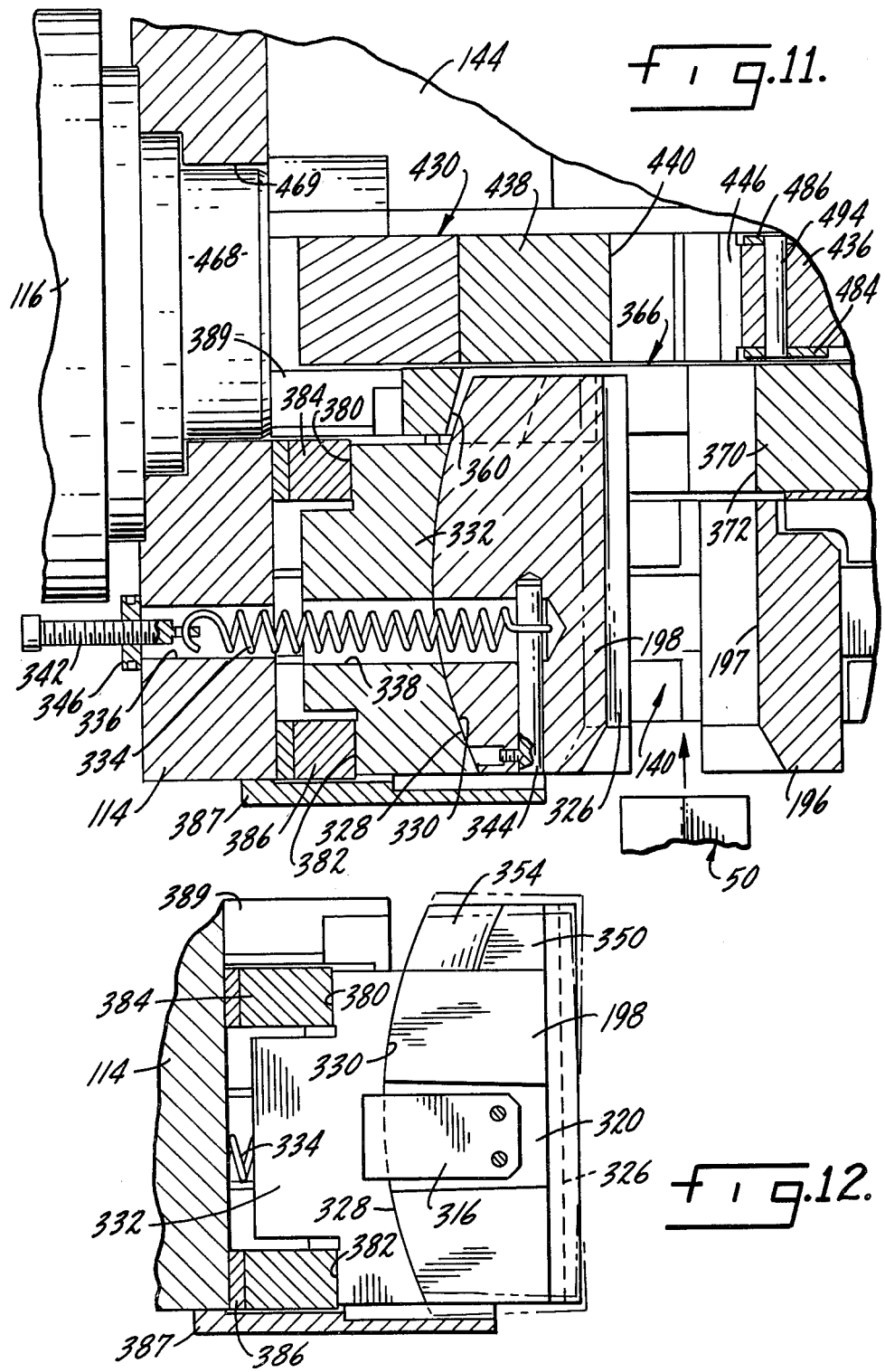

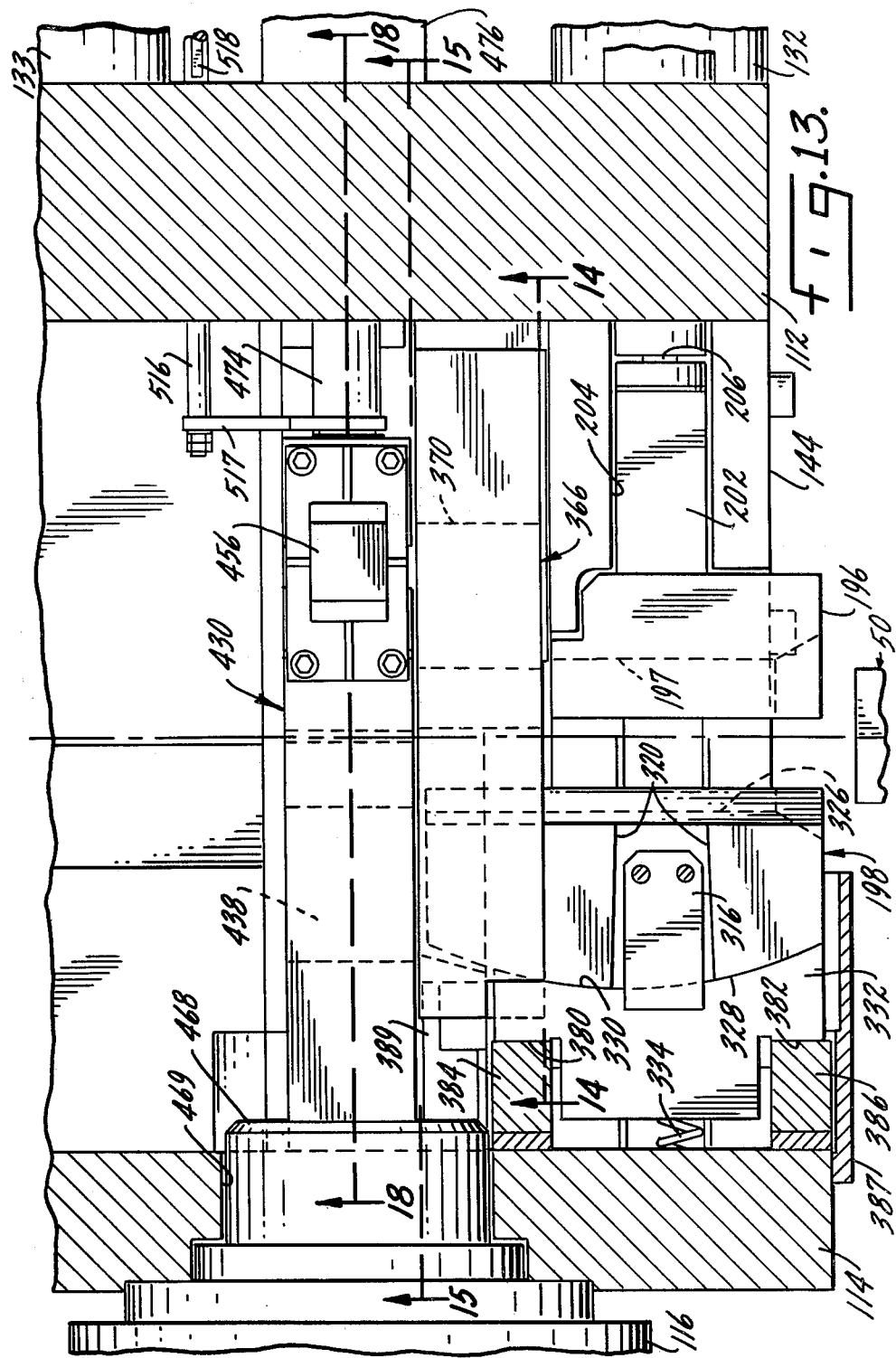

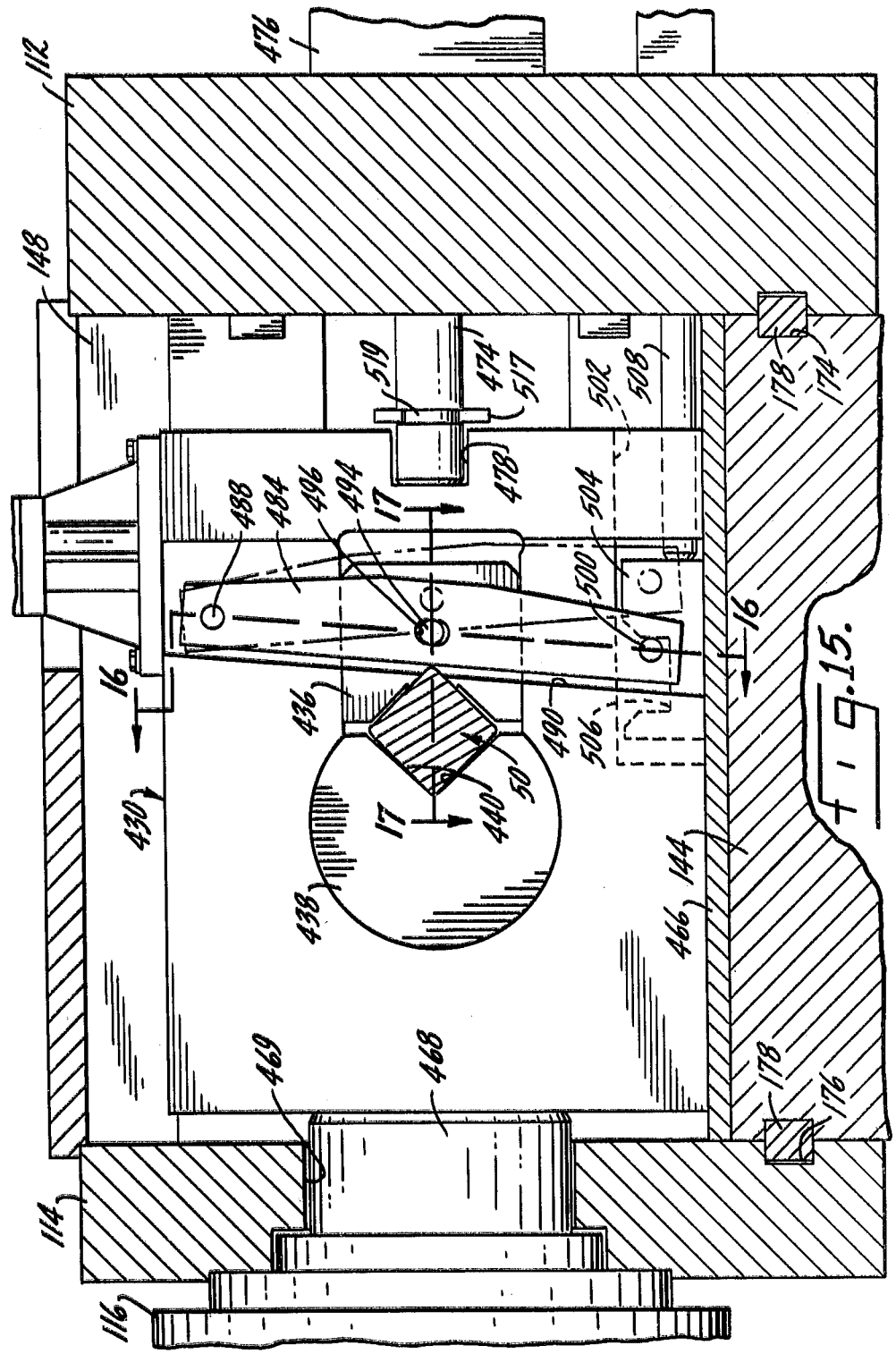

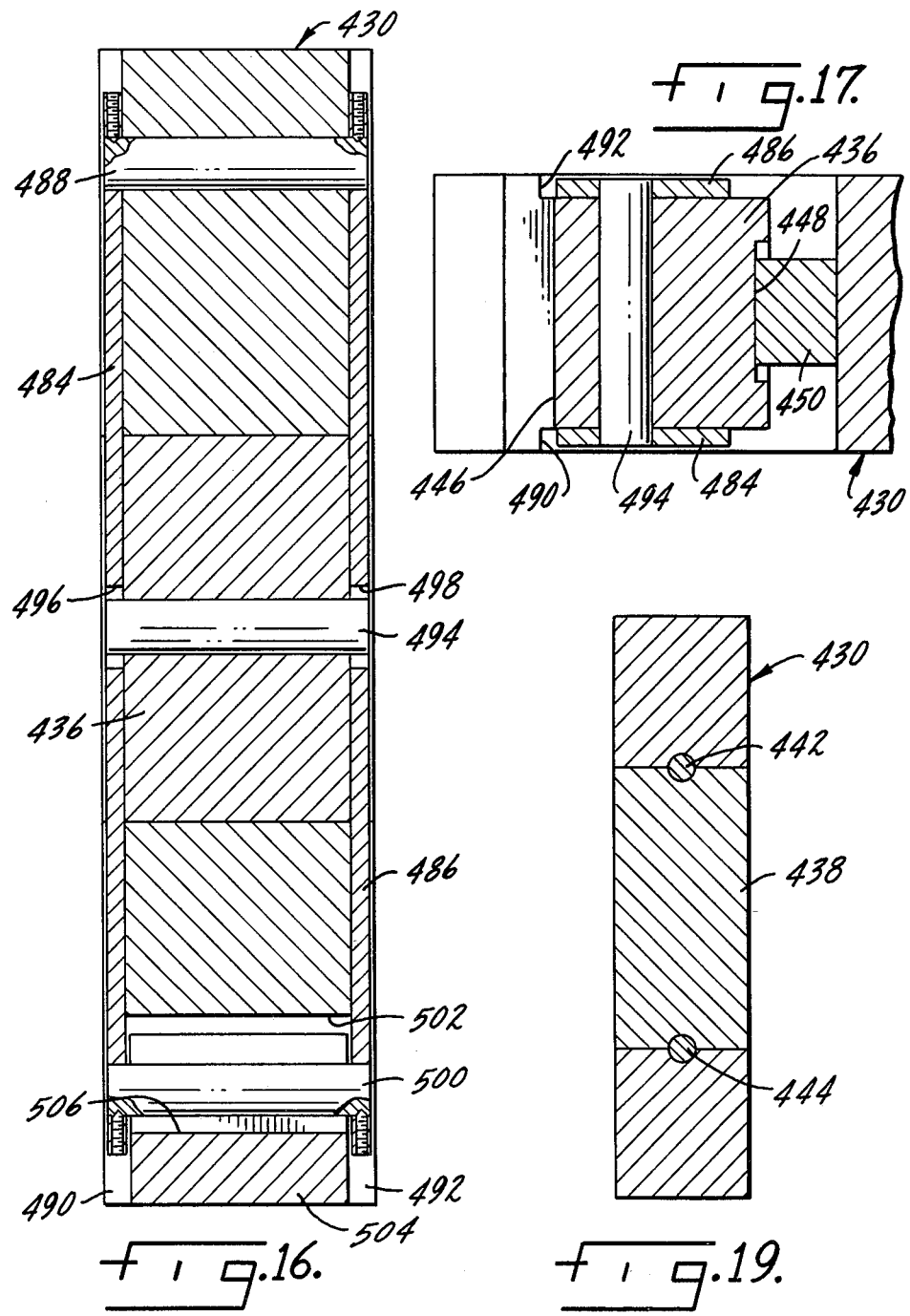

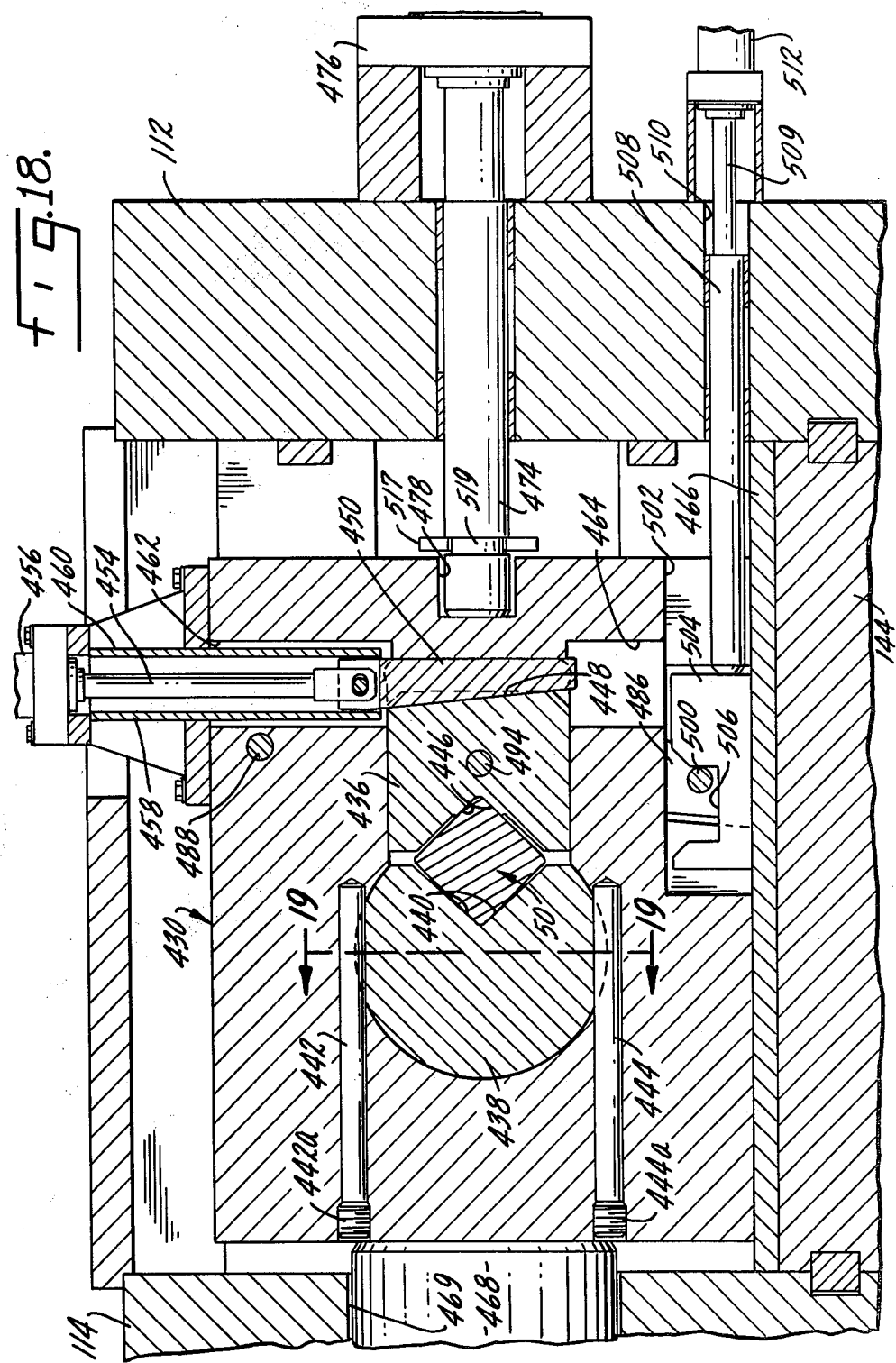

APPARATUS FOR SHEARING BARS, BILLETS, AND OTHER ELONGATED STOCK

This is a continuation of application Ser. No. 072,224, filed Sept. 4, 1979, abandoned.

DESCRIPTION

1. Technical Field

This invention relates to bar stock shears of the type wherein one portion of an elongated metal bar is restrained against movement while an adjacent portion of the bar is displaced by a moving member to shear the bar.

2. Background of the Invention

Machines have been developed for hydraulically shearing bar stock and examples of such machines are described in the U.S. Pat. No. 3,908,496 to Moelbert and the U.S. Pat. No. 3,972,257 to Lazar, Jr.

With some prior art bar stock shears, the considerable shear force can cause a bending of the second portion of the bar relative to the fixed, clamped portion of the bar. The bending is objectionable in various respects.

The parts of the bar stock shear which are in contact with the bar adjacent each side of the shear plane, such as the blades and clamps, are subjected to relatively large forces and over a period of time are worn down. Consequently, it would be desirable to reduce the bending of the portion of the bar being sheared off in order to reduce the wear rate of such parts and further, it would be desirable to provide a bar stock shear machine in which the parts more susceptible to wear can be easily and quickly replaced.

In some bar stock shearing machines, the shearing mechanisms are retained within a housing. The reaction forces from the bar and from the shearing dies or blades are transferred to the housing.

To provide sufficient strength for resisting the spreading force occuring during shearing, Lazar U.S. Pat. No. 3,972,257 provided an interlocked construction which included interlocking between the side walls and top and bottom walls. To remove the shearing mechanism, it was not only necessary to remove the top wall, but because of its structural function the means holding it in place had to be removed first.

SUMMARY OF THE INVENTION

In the preferred embodiment of the bar stock shearing machine described herein, a novel housing construction is provided that has adequate strength without the top interlock, so that the top of the housing can be essentially open (closed only by an unsecured cover). This considerably facilitates the removal of the shearing mechanism for servicing. This is one of several features which are of a nature to cooperate in better or more dependably satisfactory shearing, with reduced down time for servicing.

According to another aspect of the present invention, a novel method is provided for shearing a bar with a reduction in the bending of the portion of the bar to be sheared off. Specifically, a first portion of the bar is initially clamped and restrained against movement by the above-described infeed die assembly.

Next, a movable carrier or force transmitting means or load bearing cage is provided which carries the movable shearing blade, a backing clamp for it, and a powered actuator which uses a low-sloping wedge acting between the carrier and the clamp to move the clamp against the bar, and by reaction as the wedge enters further, move the carrier so that its shearing blade also engages the bar, the carrier being floating or free to move before the main shearing action begins. This enables the part of the bar to be sheared off to be firmly clamped between blade and backing clamp, which accomodate themselves to the position of the bar as it is held by the infeed clamp, and clamp with a vise-like action that offers no resistance to the shearing movement to follow.

A second force is then applied to the load bearing carrier in a direction normal to the longitudinal axis of the bar sufficient to move the carrier engaged with the second portion of the bar relative to the clamped first portion of the bar thereby shearing the bar without substantially bending the second portion of the bar relative to the first portion of the bar.

With the novel shearing mechanism operating in accordance with the method as described above, the quality of the shear is improved because the bending of the sheared-off portion of the bar is substantially reduced or eliminated during the shearing process. Further, the illustrated mechanical wedge engaging system that is employed to grip the portion of the bar to be sheared off and to prevent bending thereof provides a more positive restraint against bending than is believed to have been known before; and much more positive than in those types of bar shear machines wherein a main shearing member or clamp is moved against the bar and wherein an independently supported clamp or member is provided behind the bar to reduce the bending. With such conventional bar shear machines, where hydraulic cylinders are employed to operate the clamp behind the bar to reduce bending, the reduction in pressurization arising from expansion and flexing of cylinders and hoses and from encapsulated air can permit movement of the backing clamp and thus permit a greater bending. In contrast, with the novel load bearing cage assembly and wedge-operated backing clamp described herein, loosening of the backing clamp is substantially avoided.

Although Hercik U.S. Pat. No. 3,039,344 has a clamping system with some similarities, it lacks the floating self-accomodation to the bar before shearing starts, and uses a wedge of considerably more stepness than is illustrated here. Also, it lacks the carrier that can be removed easily for shop-servicing of carrier and its parts, and has only an inferior holding clamp, especially as to the tail end of a bar.

The novel combination of elements in accordance with the present invention is thus seen to yield desirable and beneficial results—results which provide a substantial improvement over the prior art.

Numerous other advantages and features of the present invention will become readily apparent from the following detailed description of the invention and of one embodiment thereof, from the claims and from the accompanying drawings.

BRIEF DESCRIPTION OF THE DRAWINGS

In the accompanying drawings forming part of the specification and in which like numerals are employed to designate like parts throughout the same.

FIG. 6 is a fragmentary, cross-sectional view taken generally along the plane 6—6 in FIG. 4;

FIG. 7 is a perspective, exploded view of the retainer plate and die housing assembly with external and internal components, such as tie rods, wear plates and shear clamps, omitted for purposes of clarity;

FIG. 8 is an enlarged, cross-sectional view taken generally along the plane 8—8 in FIG. 2;

FIG. 9 is an enlarged, fragmentary cross-sectional view taken generally along the plane 9—9 in FIG. 2;

FIG. 11 is a greatly enlarged, fragmentary, partial cross-sectional view taken generally along the plane 11—11 in FIG. 2;

FIG. 12 is a view similar to FIG. 11 but showing the range of pivotal movement of the infeed clamping block in dashed lines;

FIG. 13 is an enlarged, fragmentary, partial cross-sectional view similar to FIG. 11;

FIG. 15 is a fragmentary cross-sectional view taken generally along the plane 15—15 in FIG. 13 showing the movable shear die assembly insert and cage;

FIG. 16 is an enlarged cross-sectional view taken generally along the plane 16—16 in FIG. 15;

FIG. 17 is an enlarged fragmentary, cross-sectional view taken generally along the plane 17—17 in FIG. 15;

FIG. 18 is a fragmentary cross-sectional view taken generally along the plane 18—18 in FIG. 13;

FIG. 19, located on the sheet with FIGS. 16 and 17, is an enlarged cross-sectional view taken generally along the plane 19—19 in FIG. 18;

FIG. 25, located on the sheet with FIG. 21, is a fragmentary, cross-sectional view taken generally along the plane 25—25 in FIG. 23.

DESCRIPTION OF THE PREFERRED EMBODIMENT

This invention may be used in many different forms. This specification and the accompanying drawings disclose only one specific form of novel methods and apparatus. The invention is not intended to be limited to the embodiments of the features illustrated and described, and the scope of the invention will be pointed out in the appended claims.

The precise shapes and sizes of the components herein described are not essential to the invention unless otherwise indicated.

For ease of description, the bar shear apparatus will be described in normal operating position, and terms such as upper, lower, hoirzontal, etc., will be used with reference to this normal operating position. It will be understood, however, that the apparatus may be manufactured, stored, transported and sold in an orientation other than the normal operating position described.

The bar shear apparatus has certain conventional mechanisms, the details of which, though not fully illustrated or described, will be apparent to those having skill in the art and an understanding of the necessary functions of such mechanisms.

Figure 1:
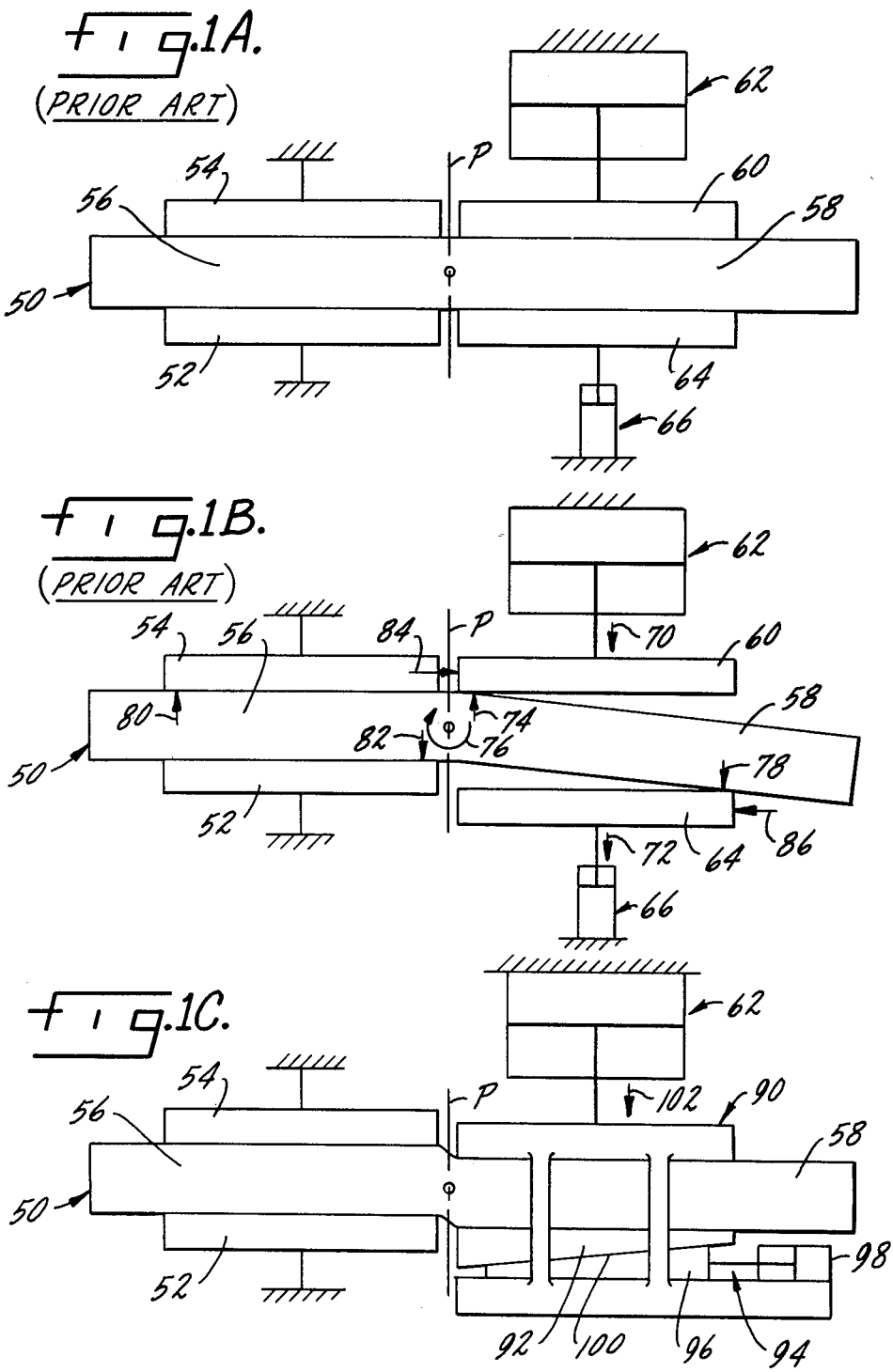
FIGS. 1A and 1B are diagrams illustrating a prior art method of shearing a bar in a bar stock shearing machine.
FIG. 1C is a diagram of a novel method of shearing a bar.

Referring now to the drawings, FIGS. 1A and 1B diagrammatically illustrate a method of shearing bar stock as found in some prior art, some dimensions being here exagerated. A bar 50 is fed into the infeed side of a bar stock shearing machine and clamped or fixed against movement by means of clamps 52 and 54. The clamps 52 and 54 are engaged with a first portion 56 of the bar from which a second portion 58 extends and which second portion 58 is to be sheared off. A shear blade or die 60 is moved to engage one side of the second portion 58 of the bar 50. The shear blade 60 may be moved against the bar by means of a conventional hydraulic cylinder-piston actuator 62. At the same time, a backing member or die clamp 64 is moved against the side of the bar opposite the shear blade 60. Die 64 may be moved against the bar by means of a conventional hydraulic cylinder-piston actuator 66. It is to be noted that backing die 64 is operated independently of shearing die or blade 60. The force exerted by actuator 62 thus has to be great enough to overcome both the strength of the bar and the backing force of actuator 66 in order to rupture and shear the bar at the shear plane P between the two clamped bar portions 56 and 58.

As illustrated in FIG. 1B, when actuator 62 forces shear blade 60 against the second portion 58 of the bar, the force of the blade 60, being transmitted through the bar, must necessarily overcome the backing force of die 64. The movement of die 60 is indicated by arrow 70 in FIG. 1B and the resulting movement of backing die 64 is indicated by arrow 72 in FIG. 1B. The end of shear blade 60 closest to the shear plane P is subjected to a reaction load indicated by arrow 74 as the bar 50 initially starts to bend about a transverse axis indicated by the torsion arrow 76. Similarly, backing die 64 is subjected to a reaction load at its outer end as indicated by arrow 78. On the restrained portion 56 of the bar 50, the clamps 52 and 54, being restrained against all movement during the shearing operation, do not permit bending of the first portion of the bar 56. However, to the extent that there may be some "looseness" in the clamps 52 and 54, the reaction load on clamp 54 would be greatest at the outer end of clamp 54 as indicated by the load acting at arrow 80 and the reaction load on clamp 52 would be greatest on the end of the clamp 52 adjacent the shearing plane P as indicated by the arrow 82.

The concentration of loads at points 74 and 78 on the clamps 60 and 64, respectively, can cause rapid die wear. Further, owing to the bending of the bar 50, transverse loads are transferred to the shear clamp 60 as indicated by arrow 84 and to the backing die clamp 64 as indicated at arrow 86 in FIG. 1B. These side loads must be taken by the machine housing or retainer plate structure. Consequently, the housing or retainer plate structure must be designed for these loads which, when relatively large bar stock is sheared, can be considerable. Such loads may be more than half of the force required to shear a bar.

Owing to the initial bending of the bar 50, the shearing of the bar 50 requires a longer stroke of the actuator 62, and hence a longer operational time.

Further, the bending of the bar decreases the quality of the shear. The bending occurs until the ultimate shear strength of the bar is exceeded and until there is an actual displacement along the shear plane P.

The above described bending of a bar stock and the disadvantages associated with that bending can be substantially reduced, if not eliminated, with a novel method as illustrated in FIG. 1C. The bar 50 is restrained against movement on its first portion 56 by clamps 52 and 54. Adjacent these clamps 52 and 54, the second portion 58 of the bar is received in a movable force transmitting means, such as a cage or holder 90. As can be seen in FIG. 1C, the cage 90 is adapted for engaging at least first and second generally opposite surface regions of the second portion 58 of the bar. To this end, the cage 90 carries a clamp 92 and a means 94 for moving the clamp 92 opposing the shear element of cage or carrier 90 against a first surface region of the second portion 58 of the bar. The clamp moving means 94 may include a wedge 96 reciprocated by a hydraulic cylinder actuator 98 against an inclined surface 100 of the clamp 92. The wedging action is between the clamp 92 and the cage or carrier 90.

A novel method is provided wherein the bar 50 is initially positioned with the first portion 56 clamped and restrained against movement and with its second portion received in the cage 90 which is initially opened and aligned in a position for receiving the bar with clearance around the bar. Next, the clamp 92 is forced by wedge 96 against the first surface region of the second portion 58 of the bar. Continued force on clamp 92 causes the cage 90 to move relative to both the bar 50 and the clamp 92 engaged with the bar 50 until the shearing cage 90 becomes engaged with a second surface region of the second portion 58 of the bar opposite the clamp 92. In this manner, the second portion 58 of the bar is tightly and mechanically clamped in vise-like manner so as to prevent or substantially reduce bending.

Next, the actuator 62 is operated to move the entire cage assembly 90 as indicated by arrow 102 to move the bar second portion 58 perpendicular to the longitudinal axis of the bar to thereby shear the bar along the shear plane P. Since the second portion 58 of the bar is securely clamped, and since bending is thereby eliminated or substantially reduced, reaction forces are more uniformly distributed along the second portion 58 within the cage 90. Thus, concentrated loads, such as those illustrated in FIG. 1B by arrows 74 and 78 for the prior art, are much reduced. Thus, the wear of the shearing mechanism is substantially reduced.

Similarly, since the force on the second portion 58 of the bar is more uniformly spread over the surfaces engaged by the cage 90 and clamp 92 compared with the concentrated loads indicated at arrows 74 and 78 in FIG. 1B, the tendency of the bar to be crushed at the shear plane and to generate stress riser concentration points is substantially reduced. Thus, the probability of cracking during later manufacturing operations on the bar or during use of the bar, is substantially reduced.

Figure 2:
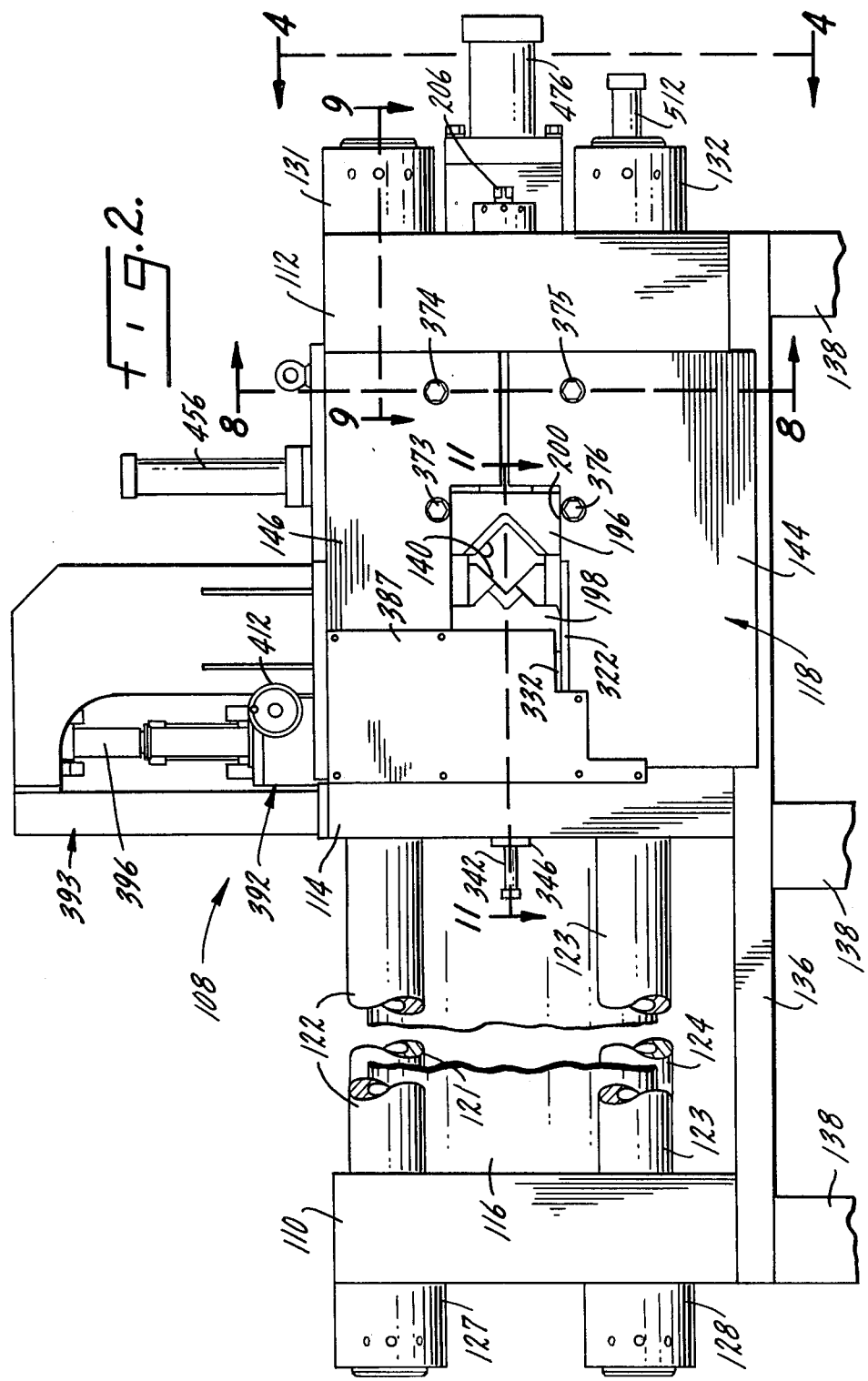
FIG. 2 is a fragmentary side view of the novel bar stock shear machine described herein.
Figure 3:
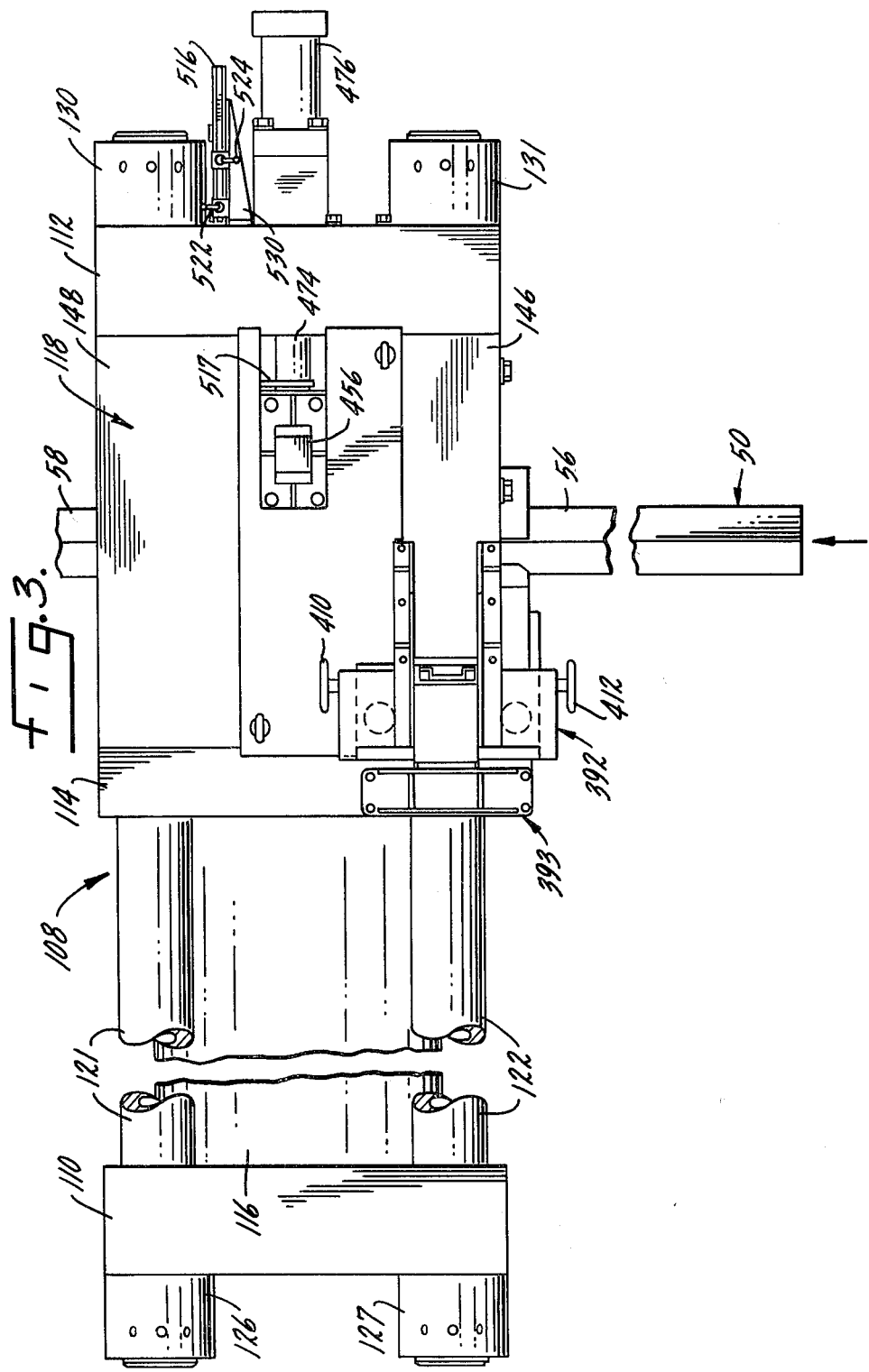
FIG. 3 is a fragmentary plan view of the top of the machine illustrated in FIG. 2.

A preferred embodiment of a bar stock shearing machine for effecting the method described above is designated generally by numeral 108 in FIGS. 2 and 3. It includes a pair of end bolsters, first end bolster 110 and second end bolster 112, and a center bolster 114 forming major structural elements of the unit. Interposed between the first end bolster 110 and the center bolster 114 is a hydraulic cylinder 116. Similarly, interposed between center bolster 114 and second end bolster 112 is a die housing assembly generally indicated at 118. Each bolster is apertured at its four corners and tie rods 121-124 are inserted through the respective apertures. The entire assembly is joined together by means such as nuts 126-133 on the tie rods. The tie rods are preferably pre-stressed by heating them and tightening the nuts while the rods are hot. This procedure places the apparatus under a relatively high compressive load. The assembly may be supported on a continuous bed plate 136 and maintained at a convenient height by support legs 138.

An opening or guideway 140 is defined on the infeed side of the machine 108 as illustrated in FIG. 2. Bar or other elongate stock is inserted through the guideway as best illustrated in FIG. 3 where a bar 50 is shown with a first portion 56 entering the infeed side of the machine and with a second portion 58 extending from the outfeed side of the machine. Typically, the bars are automatically fed by suitable conventional mechanisms (not illustrated) in end-to-end relationship into the bar shear machine. Further, such mechanisms typically automatically feed a predetermined length of bar into the machine for shearing off predetermined lengths or slugs of the bar. The particular feeding mechanism forms no part of the present invention and will not be described in detail. Similarly, mechanisms may be provided at the outfeed side of the bar shear for stacking, weighing, or conveying the sheared bar stock slugs to subsequent stations. Such outfeed mechanisms form no part of the present invention and will not be described.

In operation, the bar 50 is clamped or restrained against movement on the infeed side of the machine by mechanisms to be described in detail hereinafter. Next, the clamped bar is sheared by operation of the cylinder actuator 116 and a moving shear blade assembly in a manner to be described in more detail hereinafter. During the shearing process, the loads or reaction forces must be accommodated by the machine. To this end, a novel die housing or retainer structure is incorporated in the machine as will next be described.

Open-Sided Housing for Shearing Units

The die housing assembly 118 between bolsters 114 and 112 is configured so that the resulting loads and forces are transmitted directly to the bolsters without reliance upon bolted or welded joints or an interlocked cover. With reference to FIG. 7, the novel interlocking system of the die housing 118 can be seen in an exploded view. The internal parts, such as the tie rods, shearing and retaining clamps, pistons, and wear plates, have all been omitted for purposes of clarity.

Disposed between the center bolster 114 and the second end bolster 112 are a plurality of exceptionally sturdy retainer plates, namely a generally U-shaped retainer plate 144, an upper infeed side retainer plate 146 and an upper outfeed side retainer plate 148.

Figure 4:
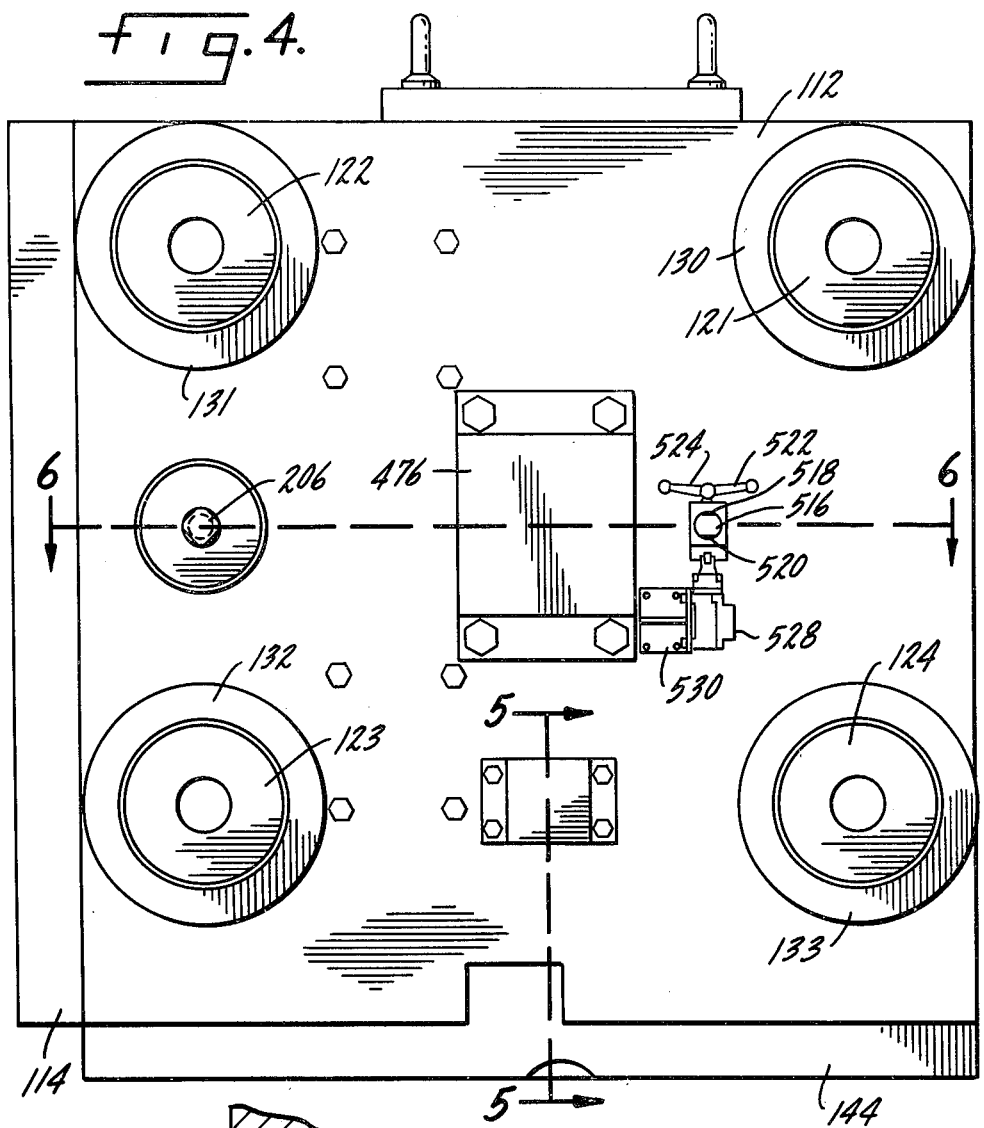
FIG. 4 is an enlarged end view taken generally along the plane 4—4 in FIG. 2.
Figure 5:
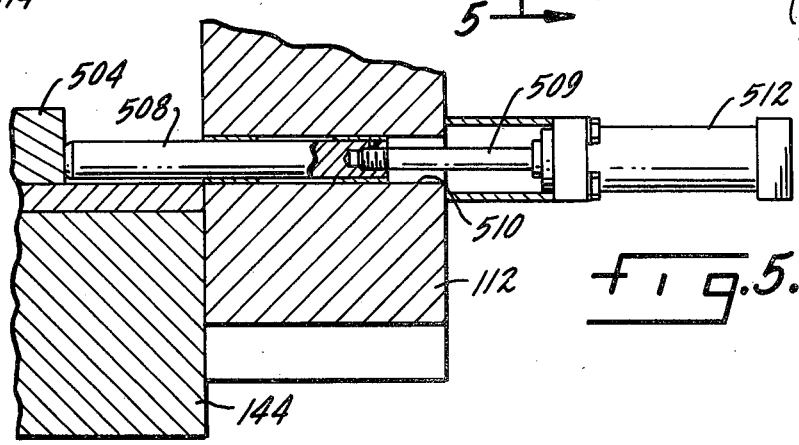
FIG. 5 is a fragmentary, cross-sectional view taken generally along the plane 5—5 in FIG. 4.

The bottom U-shaped retainer plate 144 is provided with bores 150 and 152 adapted to align with bores 154 and 156, respectively, in the second end bolster 112 and adapted to align also with bores 158 and 160, respectively, in the center bolster 114. Bottom retainer plate bore 150 and the aligned bolster bores 158 and 154 accommodate tie rod 123 (FIGS. 2 and 4). Bottom retainer plate bore 152 and the aligned bolster bores 160 and 156 receive the tie rod 124 (FIGS. 2 and 4). The plate 144, as well as the other plates, may, if desired, comprise a plurality of suitably interlocked members.

Upper infeed side retainer plate 146 defines a bore 162 adapted to align with a bore 164 in second end bolster 112 and a bore 166 in center bolster 114 for receiving tie rod 122 (see FIGS. 2 and 4). Similarly, upper outfeed side retainer plate 148 defines a bore 168 adapted to be aligned with a bore 170 in second end bolster 112 and a bore 172 in center bolster 114 for receiving tie rod 121 (see FIGS. 2 and 4).

To provide for lateral transfer of loads between the retainer plates and the center and second end bolsters, a novel key system not specifically claimed in this application is provided. Specifically, bottom retainer plate 144 defines three key cavities 174 on each end. That is, three key cavities 174 face the second end bolster 112 and three key cavities (not visible in FIG. 7) face center bolster 114. The center bolster 114 has similar key cavities 176 aligned with the facing key cavities of the bottom retainer plate 144. Similarly, second end bolster 112 is provided with key cavities (not visible in FIG. 7) which are aligned with the facing key cavities 174 in the bottom retainer plate.

Key members 178 are provided to interfit in the key cavities with substantially one half of the thickness of each key member 178 extending into the bottom retainer plate 144 and one half of each key member extending into the respective center or end bolster. In this manner, the transverse loads which result from the shearing operation and are imposed by the shearing blades onto the bottom retainer plate can be transferred to the center and second end bolsters.

In a manner similar to that described for the bottom retainer plate 144, the upper infeed side retainer plate 146 is provided with a key cavity 180 at each end and the upper outfeed side retainer plate 148 is provided with a key cavity 182 at each end. The center bolster 114 is provided with a pair of key cavities 184 aligned with and facing the key cavities in the upper retainer plates. Similarly, the second end bolster 112 is provided with key cavities (not visible in FIG. 7) which are aligned with and face the key cavities 180 and 182 in the upper retainer plates. Key members 186 are provided for joining the upper retainer plates 146 and 148 to the center bolster 114 and second end bolster 112 in the same manner in which the bottom retainer plate 144 is joined to the center bolster 114 and second end bolster 112.

With the key members properly interfitted in the retainer plates and bolsters, the assembly provides a secure housing for the internal clamps and dies with the interfitted key members and key cavities serving to bear the component forces normal to the direction of movement of the movable shear dies and blades operating within the housing as will be explained in detail hereinafter.

The assembled die housing is seen to have an opening accessible from the top of the machine between the upper retainer plates 146 and 148. This opening permits removal and installation of internal parts, namely the plate-like or slab-like shearing units 366 and 430 including replaceable shear blades and die inserts to be described in detail hereinafter.

A novel method is provided for clamping the bar from which a slug is to be sheared and for restraining it against movement as it is sheared. An infeed clamping assembly for effecting this method is mounted partially within the above-described retaining plate housing on the infeed side of the machine 108. Specifically, as illustrated in FIG. 2, the novel clamping assembly includes a backing or bar support clamp or die 196 and a movable holding or infeed clamp 198, both being disposed within the opening defined between the bottom retaining plate 144 and the upper infeed side retaining plate 146 and defining therebetween them the aperture or guideway 140 (FIG. 11) into which the bars are fed.

The backing bar support die or clamp 196 is illustrated in FIG. 6 which shows the bar support clamp 196 slidably supported on a support surface 200 of the bottom retainer plate 144. The clamp 196 has a V-shaped notch defining a bar-engaging surface 197 and the clamp 196 can be moved on the support surface 200 towards or away from a bar within the guideway. Typically, the position of clamp 196 is initially set and the clamp 196 is prevented from being moved by a bar by properly adjusting a ram 202 carried within channel 204 of the bottom retainer plate 144 (FIG. 7). The ram 202 is threadingly engaged with a rod 206 which projects through a bore 208 in the second end bolster 112 and which may be rotated from the back of the machine as necessary to move the ram 202 to the desired position.

Figure 23:
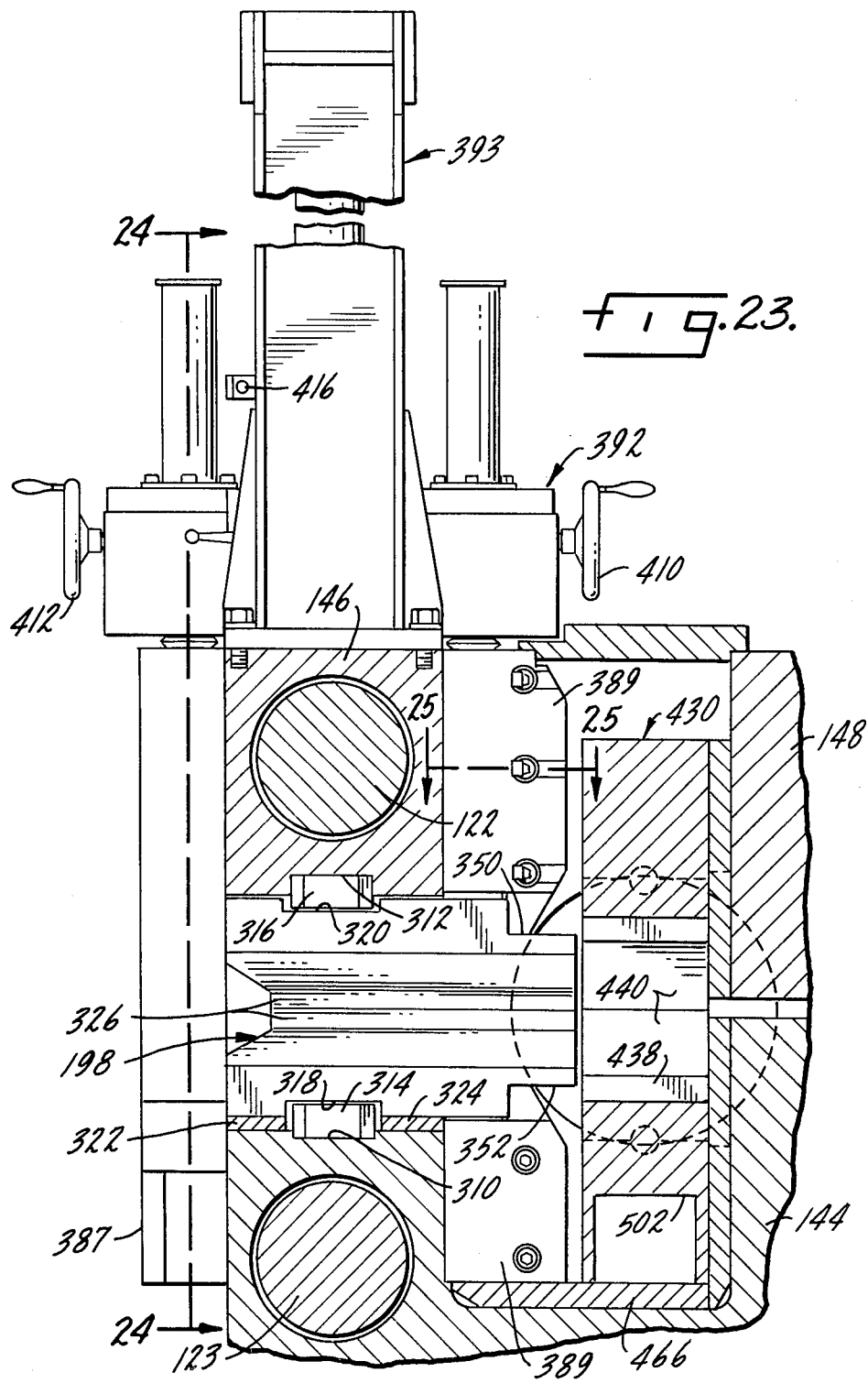
FIG. 23 is a fragmentary cross-sectional view taken generally along the plane 23—23 in FIG. 20.

The movable infeed clamp 198, which is omitted for clarity from FIG. 6, is disposed between the upper infeed side retainer plate 146 and the bottom retainer plate 144 as best illustrated in FIG. 23. To this end, the bottom retainer plate 144 defines a channel 310 and the upper infeed side retainer plate 146 defines a channel 312 for receiving, respectively, guide keys 314 and 316. Key 314 projects within a channel 318 in the bottom of the clamp 198 and key 316 as seen also in FIG. 12 projects within a channel 320 in the top of clamp 198. A pair of plates, 322 and 324 are secured to the top of the infeed side of bottom bracket 144 to provide suitable sliding bearing surfaces. Clamp 198 can thus be moved towards or away from the backing clamp 196 on the plates 322 and 324 to engage a bar disposed therebetween in the guideway. The mechanisms by which clamp 198 is thus moved will be described in detail hereinafter.

In order to accomodate cross section variation along the length of a bar, clamp 198 is supported so that it can pivot with respect to a vertical plane passing through the machine. Specifically, with reference to FIGS. 11, 12 and 13, the clamp 198 has a generally V-shaped clamping or engaging face 326 on one side and a partially cylindrical convex bearing surface 328 on the other side which is received in a partially cylindrical concave bearing surface 330 defined within a support block 332.

A spring 334 (FIG. 11) is disposed within aligned bores 336, 338, and 340 of center bolster 114, support block 332, and clamp 198, respectively, for holding the clamp 198 and support block 332 together and for biasing the assembly towards the center bolster 114. To this end, spring 334 is secured to rod 342 at one end on center bolster 114 and to pin 344 at the other end in clamp 198. Rod 342 is threadingly engaged with a collar 346 bearing on center bolster 114 so that the tension on the spring 334 may be varied by appropriate rotation of the collar 346 relative to rod 342.

With reference to FIG. 23, it can be seen that the channel 320 in the top of clamp 198 is wider than the interfitted key 316 and that the channel 318 in the bottom of clamp 198 is wider than the interfitted key 314. Thus, the clamp 198 can be rotated, relative to a vertical plane passing through the longitudinal axis of a bar to be clamped, as indicated in dashed lines in FIG. 12. This rotation (not specifically claimed in this application) is accomodated by the partially cylindrical mating bearing surfaces 328 and 330 of the clamp 198 and support block 332, respectively.

Figure 14:
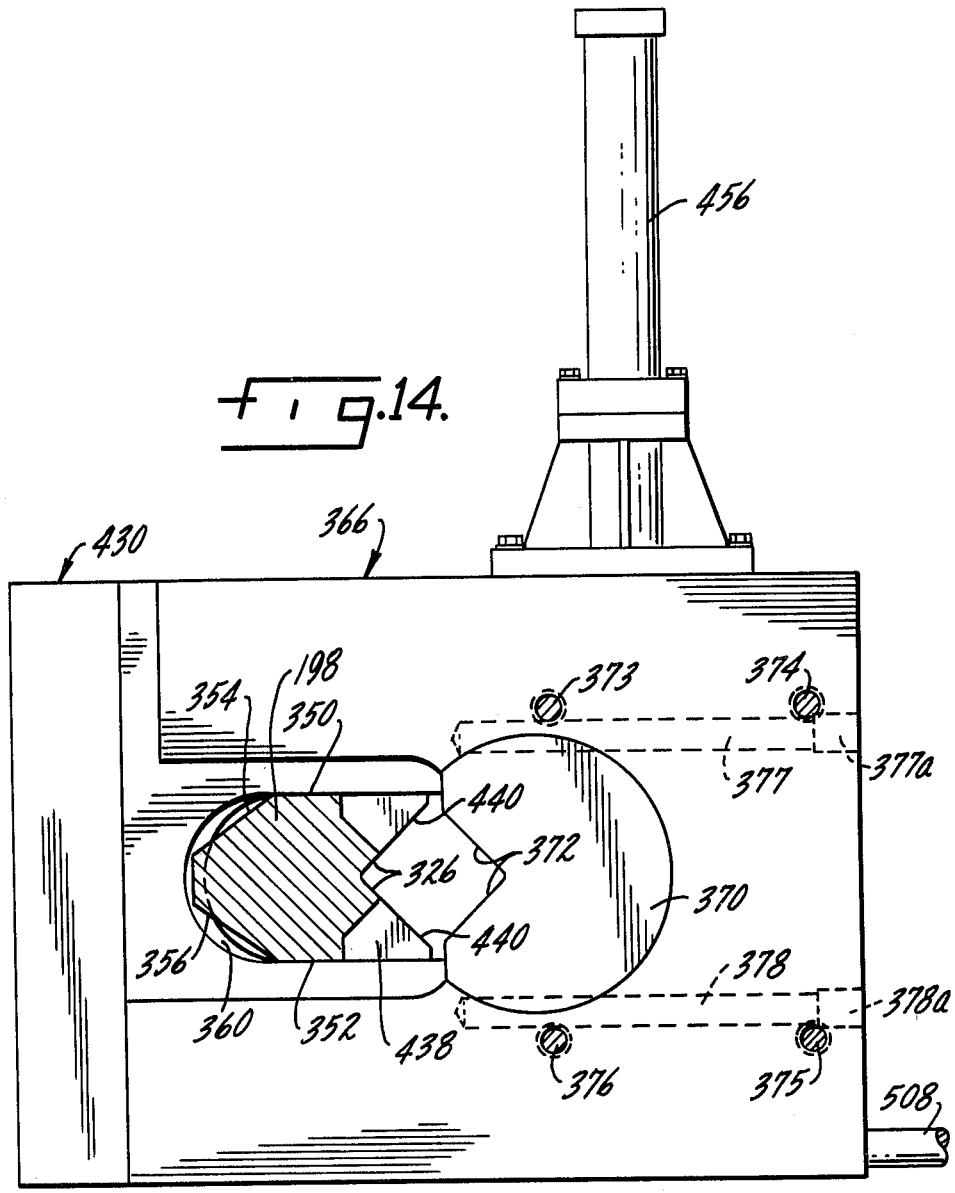
FIG. 14 is a fragmentary cross-sectional view taken generally along the plane 14—14 in FIG. 13 showing the stationary infeed backing die insert and holder.
Figure 20:
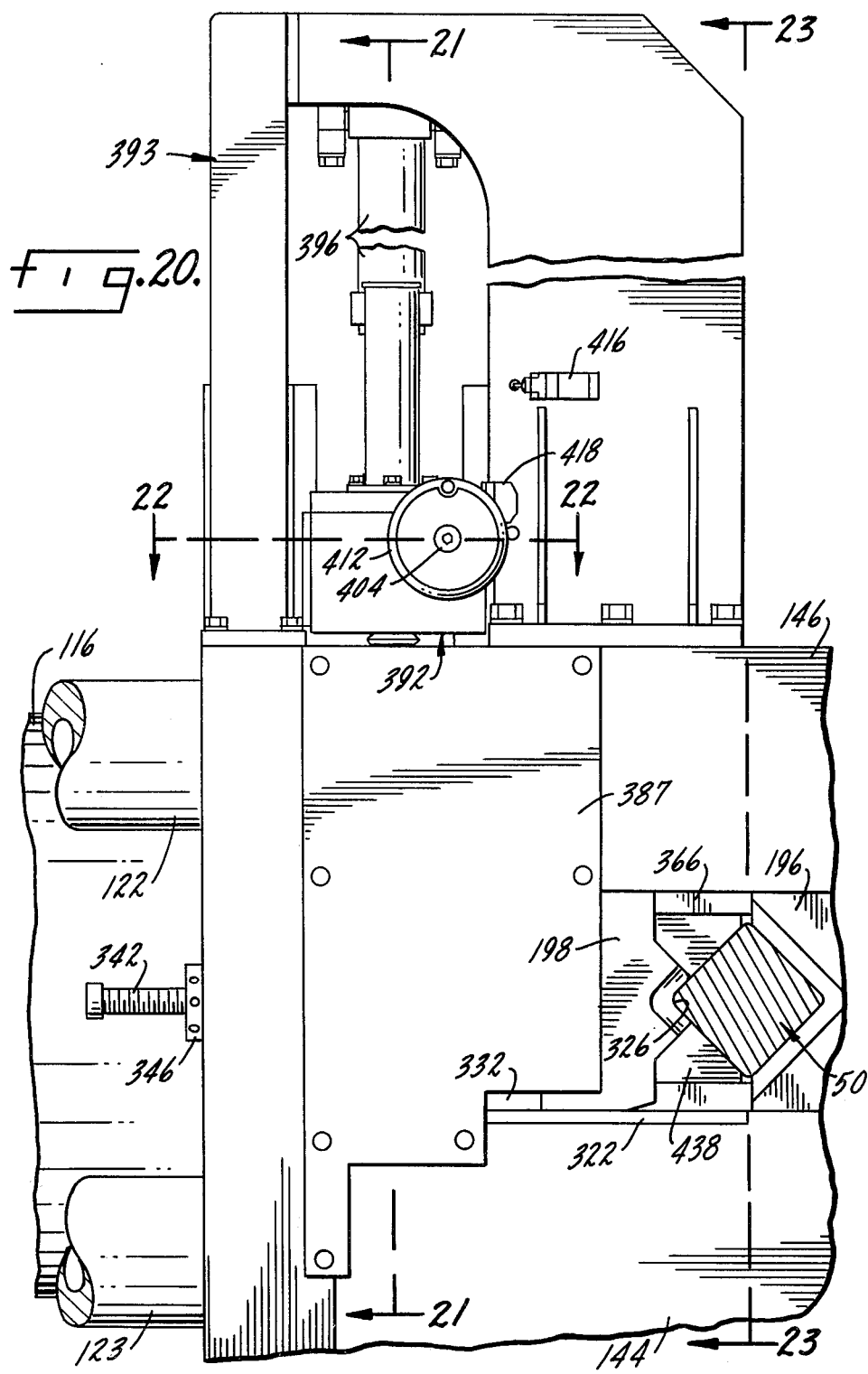
FIG. 20 is a greatly enlarged, fragmentary side view similar to FIG. 2, showing the infeed clamp assembly actuator mechanism located on the central portion of the machine.

The infeed clamp 198 extends towards the middle of the machine as illustrated in FIGS. 11, 13, 14, and 23. As best shown in FIGS. 14 and 23, the top and bottom of the clamp 198 is notched inside the machine at its upper and lower corners at 350 and 352, respectively. The notches are slanted at 354 and 356 so that the clamp 198 fits within an aperture 360 of a stationary shearing unit or assembly 366. Opposite the notched end of the movable clamp 198 is a shearing blade or second backing die or support clamp 370 which is supported within the die holder assembly 366 as best illustrated in FIG. 14. The blade or die 370 has a partially circular configuration with a generally V-shaped cut out for providing an engaging face 372 opposite the engaging face 326 of movable infeed die 198. The blade 370 is retained within the holder 366 by locking pins 377 and 378 which pass through notches or channels in the top and bottom, respectively, of the blade 370. The pins 377 and 378 are retained within holder 366 by plugs 377a and 378a, respectively.

As best shown in FIGS. 8, and 14, the entire holder 366 is secured within the machine with bolts 373–376 connecting the holder to the retainer plates 144 and 146. The bolts are not subjected to any significant transverse shear stress since the portion of the force on the bar during shearing that is transmitted back to the holder 366 is transferred to the second end bolster 112. The holder 366 can be easily removed from the machine for servicing in a shop or replacement by removing the bolts and then pulling it upwardly through the space between the upper infeed side retainer plate 146 and the upper outfeed side retainer plate 148. When the holder 366 is thus removed, the pins 377 and 378 may be removed to allow replacement of the fixed shearing blade 370.

Figure 10A:
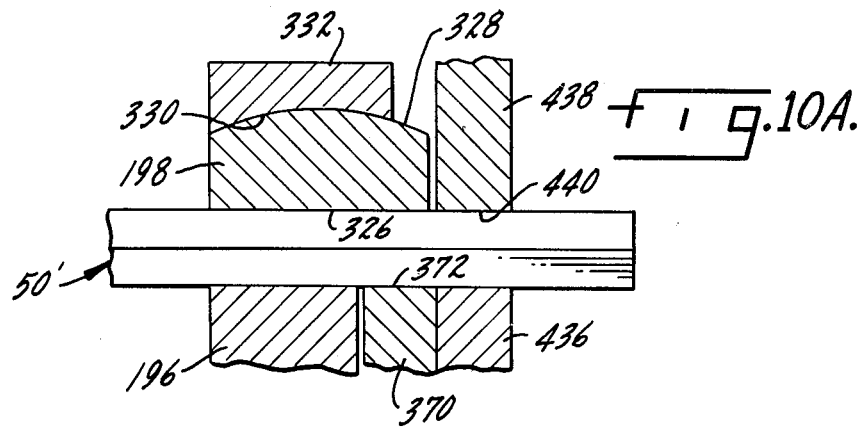
FIGS. 10A, 10B, and 10C are diagrams illustrating the novel method for clamping a bar or bars on the infeed side of a bar shearing machine.
Figure 10B:
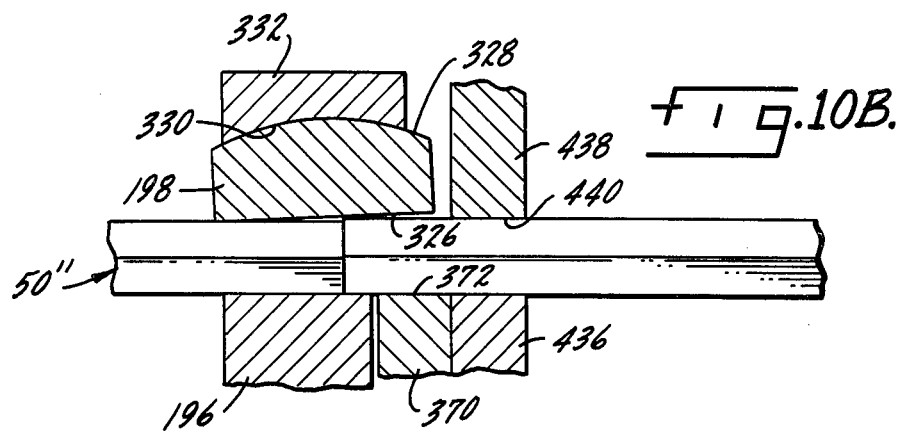
Figure 10C:
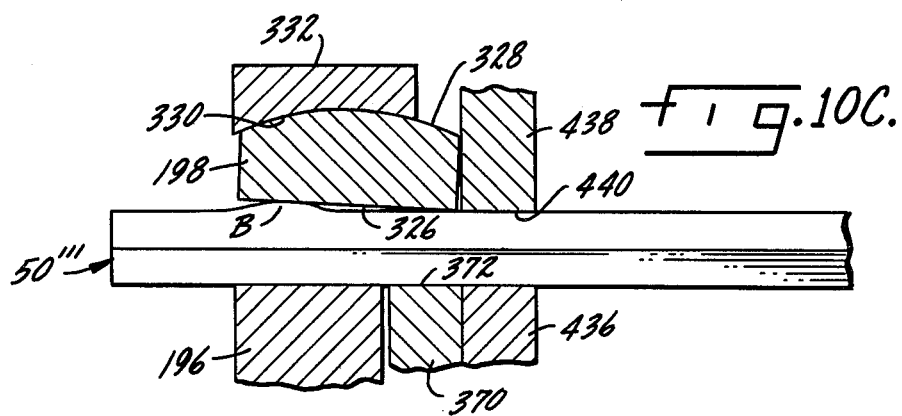

The advantage of the novel rockable infeed clamp structure is best illustrated with references to FIGS. 10A, 10B and 10C. In these figures, the backing clamp or die 196, the movable infeed clamp 198, the support block 330 and the bar 50 are illustrated only schematically for purposes of clarity.

FIG. 10A shows a bar 50' with a generally uniform cross section along its length. The clamp 198 can float or pivot on the support block 330 to align its engaging face 326 in generally continuous contact with the bar 50'.

FIG. 10B illustrates two bars of different sizes being clamped. Specifically, bar 50' has a larger cross section than bar 50''. The bars are fed into the clamping assembly in end-to-end relationship. As can be seen, when the clamp assembly is moved against the bars, the clamp 198 pivots on the support block 332 in response to the reaction forces transmitted to the clamp 198 from the regions of contact with the two bars. This orients the infeed clamp 198 at an angle relative to the longitudinal axis of the bars and in contact with the bars in at least two longitudinally spaced-apart regions. In this manner, two points or lines of contact are created with a point of contact being made on each of the two bars. Thus, with this novel method of clamping two bars of different cross sectional area, it is possible to shear each bar to relatively short lengths while still providing adequate infeed clamping capability.

FIG. 10C illustrates the novel clamping assembly in operation with a bar 50''' which has a bump or bulge B. When the clamp 198 is brought against the bar 50''' in the region of the bulge, the clamp pivots on the block 332 to establish at least 2 point contact with the bar 50'''. One region of contact is at the high point of the bulge B and the other region of contact is on the surface of the bar at a location spaced from the bulge B. This provides a better clamping action than prior art non-pivoting clamping assemblies.

Figure 21:
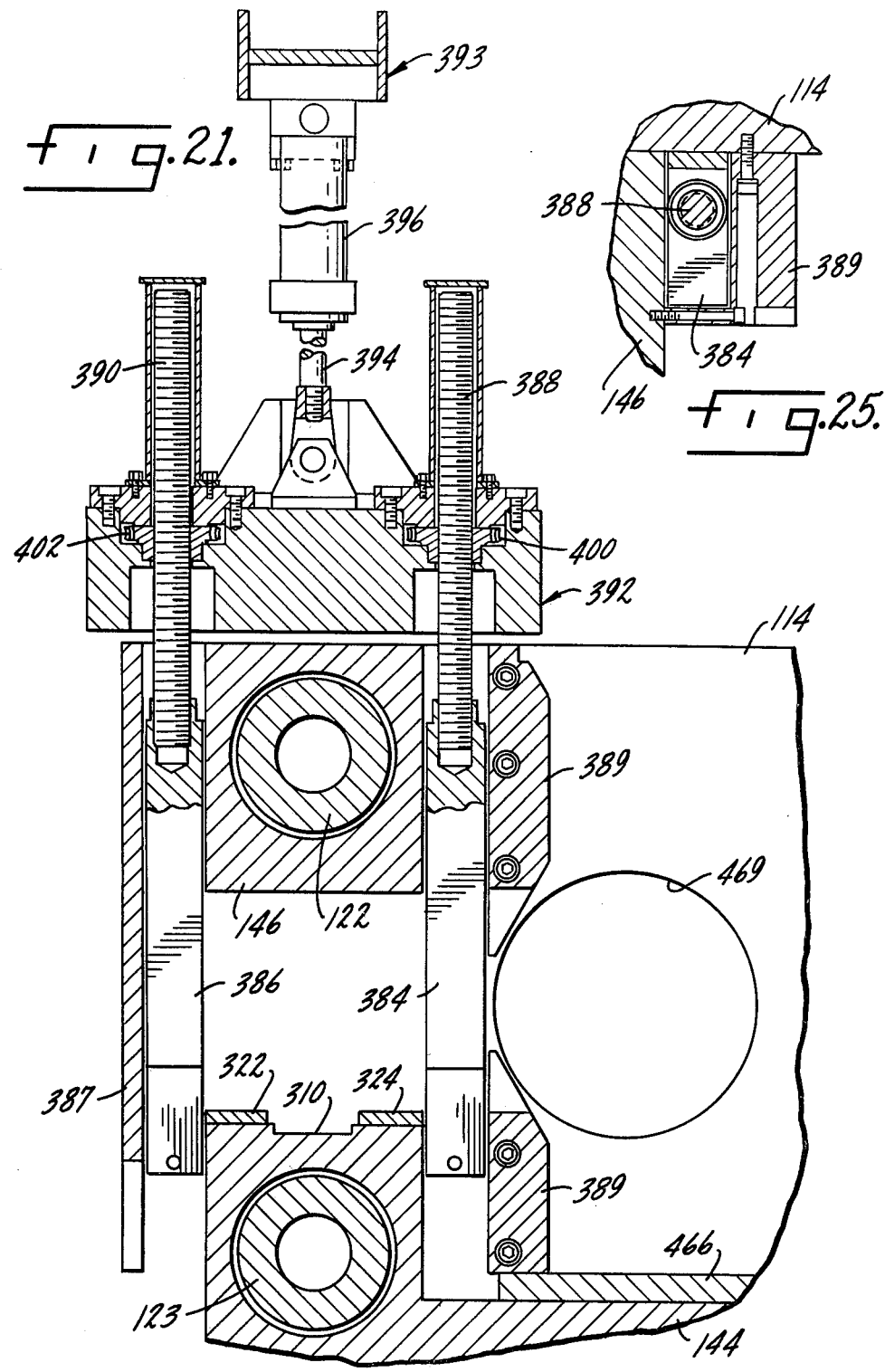
FIG. 21 is a fragmentary cross-sectional view taken generally along the plane 21—21 in FIG. 20.
Figure 22:
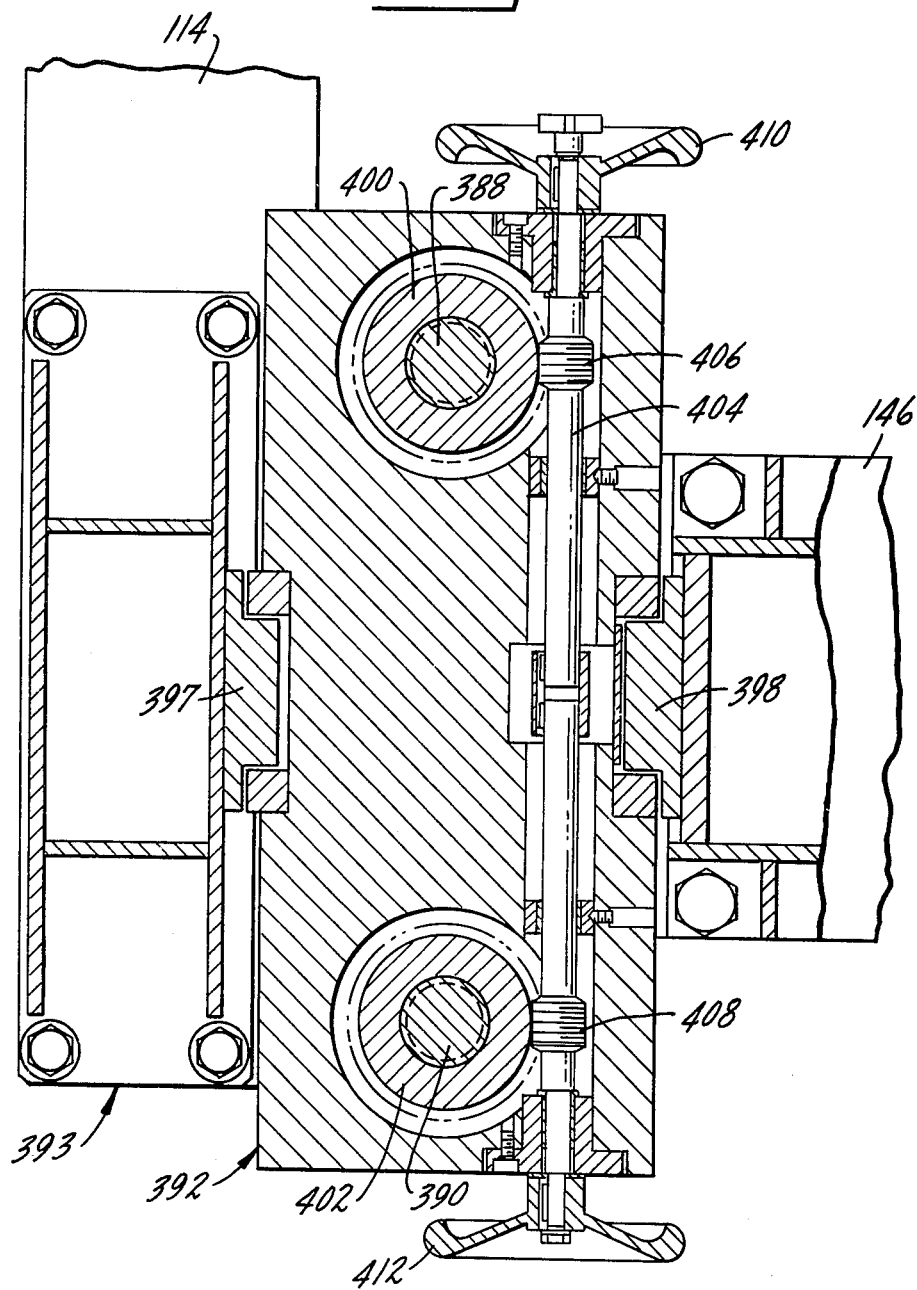
FIG. 22 is an enlarged, fragmentary cross-sectional view taken generally along the plane 22—22 in FIG. 20.
Figure 24:
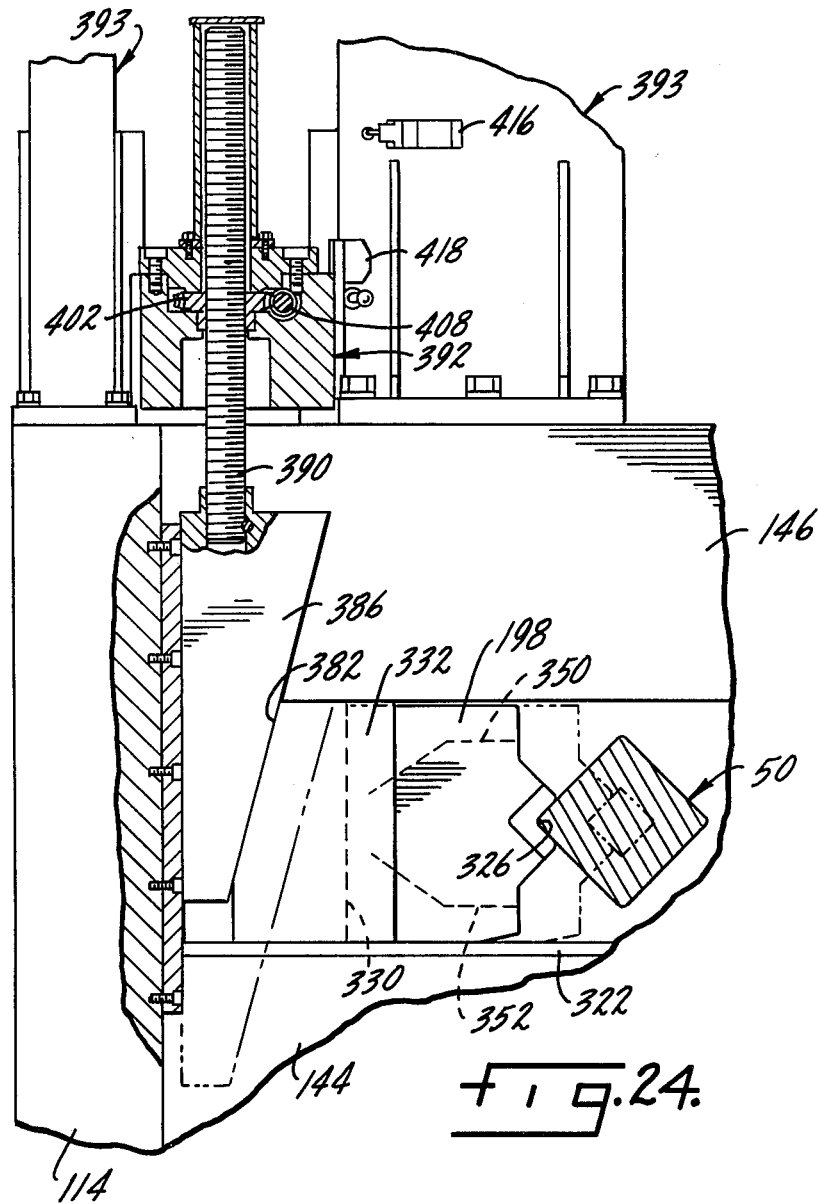
FIG. 24 is a fragmentary, cross-sectional view taken generally along the plane 24—24 in FIG. 23.

The infeed clamping assembly is moved toward and forced against a bar to effect clamping thereof by a novel wedge drive system best illustrated in FIGS. 11 and 20–25, especially FIG. 24. Specifically, the support block 332 is provided with two slanted surfaces 380 and 382 which are engaged by vertically reciprocable wedges 384 and 386, respectively. As best illustrated in FIG. 21, wedges 384 and 386 are secured to rods 388 and 390 respectively. The rods 388 and 390 are received in a mounting assembly 392 which is connected through piston rod 394 to a hydraulic cylinder actuator 396 supported from a frame structure 393. As best illustrated at FIG. 22, assembly 392 is guided for its reciprocating movement by guide members 397 and 398 engaging either side of assembly 392. The entire assembly 392 may thus be reciprocated by the actuator 396 to move the wedges 386 and 384 up and down relative to the support block 332.

As best illustrated in FIG. 21, the wedges 384 and 386 are restrained against lateral movement by exterior cover plate 387 and by internal guides 389.

As best illustrated in FIG. 24, when the cylinder 396 (FIG. 21) is actuated to move the wedges 384 and 386 downwardly, the support block 332 is moved outwardly to force the floating clamp 198 against a bar to be sheared. When the wedges are retracted by the cylinder 396, the spring 334 (FIG. 11) pulls the clamp 198 and support block 332 back and maintains the support block 332 in contact with the wedges.

In order to provide a maximum clearance for initial bar loading in the guideway between the clamp 198 and backing die 196, a novel adjustment mechanism is provided. Specifically, as best illustrated in FIGS. 21–23 the rods 388 and 390 connected to the wedges are threaded along their lengths and are engaged with gears 400 and 402, respectively. As illustrated in FIG. 22, the vertically reciprocable assembly 392 also carries a cross shaft 404 having a worm gear 406 engaged with gear 400 and a worm gear 408 engaged with gear 402. Hand wheels 410 and 412 are mounted on opposite ends of the shaft 404 by which the shaft may be rotated to turn the gears 400 and 402. Since the gears 400 and 402 are threadingly engaged with the rods 388 and 390, respectively, the vertical position of the wedges 384 and 386 may be varied by operation of either of the hand wheels 410 and 412.

In operation, the initial elevation position of the wedges 384 and 386 is set by one of the hand wheels 410 or 412 to provide a maximum clearance for initial entry of the size of the bar to be sheared. Once this wedge position is set, operation of the machine includes the automatic actuation of cylinder actuator 396 to move the wedges downwardly to force the clamp 198 tightly against the bar.

When a new bar is to enter the machine, it is especially important to have a sufficiently large clearance. However, once the bar has entered the machine, it is not usually necessary to have a large clearance in the infeed clamp assembly during successive increments of bar feeding. Consequently, with the apparatus herein described, it is possible to terminate the retraction operation of the wedges by actuator 396 short of the full return stroke. This can be accomplished by interlocking a limit switch 416 (FIG. 24) with the control system for terminating the actuation of cylinder 396 before it has retracted the wedges to the full stroke height. The limit switch 416 is preferably actuated by a finger element 418 carried by the assembly 392 as best illustrated in FIG. 24.

When a new bar is to enter the machine in an end-to-end alignment with a bar already in the machine, a suitable sensing mechanism on the infeed conveyor can be provided to override the limit switch 416 so that the cylinder actuator 396 is permitted to operate through its full retraction stroke and thereby provide the maximum set clearance for admission of the new bar.

After the bar has been securely clamped by the infeed assembly in the manner described above, the actual sharing operation can take place. A novel shearing method and apparatus for effecting such an operation is provided an important feature of this invention. As best illustrated in 13-18, a movable force-transmitting means or load bearing holder or cage or carrier 430 is disposed adjacent the stationary blade or backing die holder assembly 366 and within the housing defined by the retainer plates. The cage 430 is slab-like or plate-like, having a substantially right rectangular prism-shaped frame defining a central opening in which are disposed a bar backing clamp or die 436 and a shear blade 438. The backing die 436 is adapted for sliding movement relative to the cage 430 toward and away from a bar to be sheared while shear blade 438 is retained so that it is prevented from moving relative to the cage 430.

Shear blade 438 has a substantially circular cross section with a V-shaped notch cut out defining a bar engaging face 440 and is retained within the cage 430 by bolts 442 and 444 which pass through notches in the top and bottom, respectively, of the shear blade 438.

As best illustrated in FIGS. 15, 16 and 18, the backing clamp or die 436 defines a V-shaped notch or bar engaging surface 446 on one side and a channel with a slanted bearing surface 448 on the other side. The slanted bearing surface 448 is adapted to be engaged by a wedge 450 as best illustrated in FIGS. 17 and 18. The wedge 450 is secured to a rod 454 connected to a cylinder actuator 456 mounted to the top of the cage 430. The rod 454 and the upper portion of the wedge 450 are received between a pair of guide members 458 and 460 which project downwardly from the cylinder actuator 456 into a cavity 462 within the cage 430.

In operation, actuation of the cylinder 456 to move the wedge 450 downwardly forces the backing clamp 436 against the bar 50. An appropriate cavity 464 is provided in the cage 430 below the wedge 450 to receive the projecting bottom portion of the wedge 450 as it is moved downwardly by the cylinder 456.

Initially, the backing clamp 436 is positioned sufficiently away from the shear blade 438 (to the right as viewed in FIG. 18) to provide adequate clearance for an incoming bar. When the wedge 450 is forced against the backing clamp 436 by actuator 456, the backing clamp 436 moves against the bar (to the left as viewed in FIG. 18) and engages the bar. Note that backing clamp 436 is slidably disposed within the cage 430 and the cage 430 is slidably disposed within the die housing (on wear plate 466 on the bottom retainer plate 144 as illustrated in FIG. 18). Thus, further downward movement of wedge 450 will cause cage 430 to move and carry the shear blade 438 against the bar (to the right as viewed in FIG. 18). In this manner, the portion of the bar to be sheared is securely clamped in vise-like manner between the backing clamp 436 and the shear blade 438 which accomodate themselves to the position of bar 50 as held by the infeed clamp.

The positioning of the holder 366 and the movement of the cage 430 therealong are accommodated by various side and end shim and wear plates positioned within the retainer plate cavity.

The bar is then sheared by actuation of the hydraulic cylinder 116 (FIGS. 2 and 3). The cylinder 116 acts on a main ram 468 extending through a bore 469 in center bolster 114 (FIG. 18) to move the entire cage 430 (to the right as viewed in FIG. 18) to shear the bar.

After the bar has been sheared, the cage 430 is returned to the initial loading position and the backing clamp 436 is moved to a clearance position relative to the shear blade 438 by mechanisms as will next be described.

Primarily, the entire cage 430 is returned to the initial position by a small return ram 474 operated by a hydraulic cylinder actuator 476. The distal end of ram 474 is received in a suitable cavity 478 defined in the end of cage 430. As viewed in FIG. 18, operation of the actuator 476 to move the ram 474 to the left will return the cage 430 to the initial bar loading position.

To "open up" the backing clamp or die 436 to provide clearance for the next incoming portion of the bar, a novel return mechanism is provided. Specifically, and as best illustrated in FIGS. 15-17, a pair of side links 484 and 486 are pivotally mounted about pin 488 at their upper ends on either side of cage 430. To this end, cage 430 is provided with a channel 490 for receiving link 484 and with a channel 492 for receiving link 486. The links 484 and 486 are thus recessed in the channels in the cage 430 and may pivot within the channels about the pin 488.

A pin 494 is mounted through backing clamp 436 and is received on each end within elongated apertures 496 and 498 in the links 484 and 486, respectively. A pin 500 joins the bottom ends of the links 484 and 486. The bottom portion of cage 430 defines a cavity 502 to allow movement of the pin 500 and to receive a pin engaging block 504. The cavity 502 communicates at the sides of cage 430 with the link channels 490 and 492.

Block 504 defines a channel 506, the vertical walls of which are adapted to engage the pin 500. Block 504 is slidably disposed within cavity 502 on plate 466 and is connected to rods 508 and 509 passing through bore 510 in a second end bolster 112. Rod 509 is the piston rod of a hydraulic cylinder actuator 512 mounted to bolster 112.

After the cage 430 has been returned by actuator 476 to the initial bar loading position, the actuator 512 is operated to move the block 504 to the right, as viewed in FIGS. 15 and 18 to move pin 500 to the right. This causes the links 484 and 486 to pivot about pin 488 in a counterclockwise direction. This movement of the links forces pin 494, and hence the backing clamp 436, to the right, as viewed in phantom lines in FIG. 15, to provide an initial clearance for the incoming bar.

Operation of the actuator 476 to return the cage 430 back to the initial bar loading position may be effected through the use of a suitable control system with limit switch actuation. Specifically, as best illustrated in FIGS. 3, 4, and 6, the second end bolster 112 is provided with a bore 514 for receiving a travel indicating rod 516 extending therethrough. Inside the retainer housing, the rod 516 is connected to ram 474 by a bracket 517 engaging a circumferential channel 519 in the ram 474. The rod 516 has oppositely facing flat surfaces 518 and 520 extending beyond bolster 112. Mounted to the end of the rod 516 projecting on the exterior side of the second end bolster 112 are adjustable clamps 522 and 524. The clamps may be adjusted to any position on the flattened portion of the rod 516 extending exterior of the second end bolster 112.

As best illustrated in FIGS. 4 and 6, two limit switches, 526 and 528, may be provided to be actuated by downwardly extending portions of the clamps. As shown in FIG. 4 for limit switch 528, switches 526 and 528 are supported from a bracket 530 secured to the exterior surface of the second end bolster 112. Thus, movement of the ram 474 causes the clamps 522 and 524, carried on rod 516, to actuate their associated limit switches. The interaction of the limit switches with the control system in the operation of shearing the bar will next be explained.

When the machine is ready to receive a bar, the infeed side clamp assembly, comprising clamps 196 and 198, is open to provide appropriate clearance. Also, the shearing clamps, clamps 436 and 438, are also open to provide the initial loading clearance. When the bar has been fed into the machine a predetermined amount by the bar feeding mechanism (not illustrated), an appropriate signal from the bar feeding mechanism initiates the clamping of the bar on the infeed side by actuating the cylinder 396 to move the infeed clamp 198 against the bar and force the bar against the backing clamp 196. At the same time, and from the same infeed mechanism signal, the cylinder 456 is actuated to move the backing clamp 436 against the bar. When the backing clamp 436 engages the bar, continued force applied to the clamp 436 by the cylinder 456 causes the cage 430 to move relative to both the bar and clamp 436 to engage the shear blade 438 securely against the bar.

It is to be noted that the cylinder 476 may be continuously pressurized so as to provide a suitable nominal return force against the cage 430. This force will be overcome by the movement of the cage 430 under the actuation of the wedge cylinder 456 and main ram cylinder 116. The force exerted by these cylinders is relatively great and of course easily overcomes the continuously applied return force of cylinder 476. A pressure switch (not illustrated) in the hydraulic circuit of the wedge actuator 456 can be provided to actuate the main ram cylinder 116 to move the main ram 468 against the cage 430, and force it through the shearing movement.

As the cage 430 is moved by the main ram 468 (to the right as viewed in FIG. 18), the bar is sheared and the cage 430 moves to the end of its allowable travel within the housing. This maximum travel may be sensed by the limit switch 528 associated with the travel clamp 522 (FIGS. 3 and 6). Alternatively, the reduction in pressure in the hydraulic system supplying the main cylinder operator 116 could also be sensed.

In any case, a signal generated at the completion of the shear step is used to reverse the operation of the main ram cylinder 116 and to reverse the operation of the wedging cylinder 456. Since the cylinder 476 is continuously pressurized, reversal of the main ram cylinder 116 permits the low pressure cylinder 476 to force the cage 430 back to the initial bar loading position. As this is occurring, the wedge 450 is being retracted by cylinder 456.

The second limit switch 526 associated with travel clamp 522 (FIGS. 3 and 6) senses the return of the cage 430 to the initial bar loading position and actuates the cylinder 512 to move the backing clamp 436 away from the shear blade 438 to thus "open up" the assembly and provide clearance for the next portion of the bar to be inserted therein.

With the novel apparatus for shearing bar stock described above, it can be seen that the moving shear assembly, including the cage 430, shear blade 438, and backing clamp 436, can be easily lifted from the die area of the machine to enable rapid replacement of parts that are susceptible to wear, such as the clamp 438 and clamp 436. Further, the entire machine may be operated in either vertical or horizontal orientations.

With the novel apparatus described herein, the clamping of the portion of the bar to be sheared between the backing clamp 436 and shear blade 438 is effected by means of a positive metal-to-metal transference of load through the drive wedge 450. Any tendency of this portion of the bar to bend is countered by the direct mechanical restraint which does not oppose (and hence does not substract from) the shearing force applied by the main shearing ram cylinder 116. Bending of the bar is substantially reduced with this apparatus so that the deformation of the bar occurs primarily across the shear plane.

It may be observed from comparing FIG. 18 and FIG. 24 that the slope of wedge 450 for the backing clamp 436 is shown considerably lower than the slope of wedge 386 for the holding clamp 198. The higher mechanical advantage of the wedge for backing clamp 436 is appropriate when, as seen in FIG. 11 the length of clamp 436 along the bar is shorter than the length of holding clamp 198 along the bar, so that the latter will usually have a longer lever arm, measured from the shearing plane, for resisting bending of the portion of the bar held.

In the preferred embodiment of the bar shear apparatus illustrated, it is to be noted that the center bolster 114 is interlocked with the housing retainer plates 144, 146, and 148 and receives the main ram 468 so that the piston rod bearing of cylinder 116 is relatively close to the moving shear assembly. This reduces the moment arm length through which the transverse bending-induced shear loads act. The transverse loads on the bearing structure are thus reduced.

Further, the center bolster provides a direct transfer of clamping load on the infeed side of the apparatus. This elimiates the tendency of the apparatus acting as a "knuckle press" which characterizes some prior art machines.

From the foregoing, it will be observed that numerous variations and modifications may be effected without departing from the true spirit and scope of the novel concept of the invention. It is to be understood that no limitation with respect to the specific apparatus and method illustrated herein is intended or should be inferred. It is, of course, intended to cover by the appended claims all such modifications as fall within the scope of the claims.

What is claimed is:

1. In shearing apparatus for elongate stock such as bars, which includes a relatively fixed shear and a movable shear for cooperation therewith along a shearing plane; a holding clamp movable generally toward the fixed shear to hold in shearing position across it stock from which a piece is to be sheared, said clamp engaging the stock at a point spaced from the shearing plane; a backing clamp movable relatively toward the movable shear for resisting, during shearing, the bending of the portion of the stock to be severed; a carrier carrying both the movable shear and the backing clamp; clamp actuating means also carried by the carrier; and main power means for moving the carrier and its shear through the shearing stroke; the cooperative improvements in which:

said carrier is a floating carrier, free before actuation of said main power means to accommodate itself to the position of the stock as held by the holding clamp while the backing clamp is firmly set, and then to be moved in shearing action with the firmly held stock portion being severed;

said clamp-actuating means includes low-slope wedging means with power actuation to continue its firm holding throughout the shearing action, the wedging means acting between the backing clamp and carrier;

the shears are restrained from spreading apart by restraining walls held by heavy bolsters at their ends which leave an access opening along one side through which the shears can be removed for servicing, the walls adjacent the access opening being thick and sturdy to resist by their strength and end connections alone the spreading forces during shearing stock corresponding to maximum rating whereby there may be easy access through the access opening; and the clamp actuating means extending out through said opening and being readily removable with the carrier;

the shears are removable inserts, for easy replacement or servicing, in slab-like holders to which they transmit their thrust;

the spreading forces are further resisted by lower side walls forming with a bottom wall a sturdy U-shaped unitary piece.

2. In shearing apparatus according to claim 1, the improvement in which slab-like units removable through the opening carry the inserts, and the inserts lie within the slab-like boundaries of the units.

3. In shearing apparatus according to claim 1, the improvement in which slab-like units removable through the opening carry the inserts, and the inserts, including the backing clamp, lie within the slab-like boundaries of the units.

4. In shearing apparatus for elongate stock such as bars, which includes a relatively fixed shear and a movable shear for cooperation therewith along a shearing plane; a holding clamp movable generally toward the fixed shear to hold in shearing position across it stock from which a piece is to be sheared, said clamp engaging the stock at a point spaced from the shearing plane; a backing clamp movable relatively toward the movable shear for resisting, during shearing, the bending of said piece; a carrier carrying both the movable shear and the backing clamp; clamp actuating means also carried by the carrier; and main power means for moving the carrier and its shear through the shearing stroke; the improvement in which:

said carrier is a floating carrier, free before actuation of said main power means to accomodate itself to the position of the stock as held by the holding clamp while the backing clamp is firmly set, and then to be moved in shearing action with the firmly held stock portion being severed.

5. In shearing apparatus according to claim 4, the improvement thereof in which, also the clamp actuating means includes low-slope wedging means with power actuation to continue its firm holding throughout the shearing.

6. In shearing apparatus according to claim 4, the improvement thereof in which, also, the clamp actuating means includes low-slope wedging means with power actuation to continue its firm holding of the stock throughout the shearing action; and said carrier and its shear and clamp and the fixed shear with a carrier by which it is held are readily removable for servicing, and said shears are removable inserts in their respective carriers for easy servicing or replacement.

7. The shearing apparatus improvement according to claim 4 in which power operating means is provided for the holding clamp and is arranged to have its operation initiated simultaneously with the actuating means for the backing clamp, but constructed to have less mechanical advantage so as to tend to clamp the stock before the backing clamp is set.

8. In a machine for shearing elongate stock such as bars fed through the machine and having bolsters spaced in one direction and retaining walls extending between them and rigidly secured to them at the ends of the walls, and plate-like shearing units confined between the retaining walls and cooperating with each other for shearing, thereby producing a spreading force transverse to said direction and resisted by said walls, the retaining walls and bolsters forming essentially a box which, at least during servicing, is open on one side, the improvement in which one of the plate-like units has therein two removable inserts, one a shearing blade substantially fixed in position in the unit and which transmits its spreading thrust to the unit, and the other a backing clamp movable toward the blade for clamping stock.

9. In a machine according to claim 8, the improvement in which also the two inserts lie within the plate-like boundaries of the unit.

10. In shearing apparatus for elongate stock such as bars, which includes a relatively fixed shear and a movable shear for cooperation therewith along a shearing plane; a holding clamp movable generally toward the fixed shear to hold in shearing position across it stock from which a piece is to be sheared, said clamp engaging the stock at a point spaced from the shearing plane; a backing clamp movable relatively toward the movable shear for resisting, during shearing, the bending of the portion of the stock to be severed, a carrier carrying both the movable shear and the backing clamp; clamp actuating means also carried by the carrier; and main power means for moving the carrier and its shear through the shearing stroke; the improvement in which:

said clamp-actuating means includes low-slope wedging means with power actuation to continue firm holding of the stock against the movable shear throughout the shearing action; the slope of the wedging means being substantially less than 30°, and the engagement of the backing clamp along the length of the stock being substantially within the length of the stock engaged by the movable shear, and the carrier is a removable, slidably positioned slab-shaped member arranged to be thrust by the main power means, and carried the movable shear and backing clamp as removable inserts; the clamp actuating means extending from a narrow side of the slab-like carrier.

11. In a machine for shearing elongate stock such as bars fed through the machine and having bolsters spaced in one direction and retaining walls extending between them and rigidly secured to them at the ends of the walls, and plate-like shearing units confined between the retaining walls and cooperating with each other for shearing, thereby producing a spreading force resisted by said walls, the improvement in which the retaining walls and bolsters form essentially a box open on one of its six sides for removal of said plate-like units, the retaining walls adjacent the open side being sturdy and totally dependant on their strength and their connections with the bolsters for resisting the spreading force with stock representing maximum rating, and one of the shearing units includes within its plate-like boundaries a shearing blade and means cooperating with the blade for clamping stock thereto; power means for operating said last named means carried by this shearing unit on its side toward said open side and projecting outwardly therefrom with a construction that does not interfere with removal of the unit through said opening.

12. In a machine for shearing elongate stock such as bars fed through the machine and having bolsters spaced in one direction and retaining walls extending between them and rigidly secured to them at the ends of the walls, and plate-like shearing units confined between the retaining walls and cooperating with each other for shearing, thereby producing a spreading force resisted by said walls, the improvement in which the retaining walls and bolsters form essentially a box open on one of its six sides for removal of said plate-like units, the retaining walls adjacent the open side being sturdy and totally dependant on their strength and their connections with the bolsters for resisting the spreading force with stock representing maximum rating, and one of the shearing units includes a shearing blade and means cooperating with the blade for clamping stock thereto, both lying within the plate-like boundaries, and power means for operating said last named means constructed not to interfere with removal of the unit; and the other of said units being free from clamping structure, but having an opening therein opposite its shearing blade to receive clamping means held by other structure than said unit.

13. The improvement according to claim 12, in which clamping means extends into the specified opening in a shearing unit, and means for operating said clamping means lies adjacent said unit, in alignment with the retaining walls.

14. In a machine for shearing elongate stock such as bars, the improvement according to claim 11 or 12 in which the retaining walls remote from said open side form a sturdy U-shaped unitary section, with the plate-like units extending from between the legs of the U to between the the walls adjacent the open side.

* * * * *

UNITED STATES PATENT AND TRADEMARK OFFICE
CERTIFICATE OF CORRECTION

PATENT NO. : 4,445,410

DATED : May 1, 1984

INVENTOR(S) : John D. Lazar, Jr.   and Benyamin Shvartsman

It is certified that error appears in the above-identified patent and that said Letters Patent are hereby corrected as shown below:

Col. 2, line 45, for "stepness" read "steepnes".
Col. 4, line 47, insert "the" before "shear".
Col. 5, line 43, after "shearing" insert "element of"
Col. 11, above line 27, insert a heading reading
   "Vise-Like, Self-Accomodating Clamping Before Shearing"
Col. 11, line 31, delete "provided".

Signed and Sealed this

Thirteenth Day of November 1984

[SEAL]

*Attest:*

GERALD J. MOSSINGHOFF

*Attesting Officer*   *Commissioner of Patents and Trademarks*

UNITED STATES PATENT AND TRADEMARK OFFICE
CERTIFICATE OF CORRECTION

PATENT NO. : 4,445,410
DATED : May 1, 1984
INVENTOR(S) : John D. Lazar, Jr. and Benyamin Shvartsman It is certified that error appears in the above-identified patent and that said Letters Patent is hereby corrected as shown below:

Col. 2, line 45, for "stepness" read --steepness--.
Col. 4, line 47, insert "the" before --shear--.
Col. 5, line 43, after "shearing" insert --element of--.
Col. 11, above line 27, insert a heading reading
 --Vise-Like, Self-Accomodating Clamping Before Shearing--
Col. 11, line 31, delete "provided".

This certificate supersedes certificate of correction issued November 13, 1984.

Signed and Sealed this

Twenty-second Day of October 1985

[SEAL]

Attest:

Attesting Officer

DONALD J. QUIGG

Commissioner of Patents and Trademarks—Designate